(12) United States Patent
Isomura et al.

(10) Patent No.: US 6,199,908 B1
(45) Date of Patent: *Mar. 13, 2001

(54) STEERING WHEEL AND HORN SWITCH ASSEMBLY FOR THE STEERING WHEEL

(75) Inventors: Motoi Isomura; Yoshiyuki Fujita, both of Aichi (JP)

(73) Assignee: Toyoda Gosei Co., Ltd., Aichi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/514,310

(22) Filed: Feb. 28, 2000

Related U.S. Application Data

(62) Division of application No. 09/007,772, filed on Jan. 16, 1998, now Pat. No. 6,079,737.

(30) Foreign Application Priority Data

Jan. 16, 1997 (JP) .......................................... 9-5148
Jan. 17, 1997 (JP) .......................................... 9-6767
Jan. 17, 1997 (JP) .......................................... 9-6780

(51) Int. Cl.$^7$ .................................................. B62D 1/11
(52) U.S. Cl. ............................. 280/777; 280/731; 74/552
(58) Field of Search ............................. 280/731, 728.3, 280/777, 750; 74/552

(56) References Cited

U.S. PATENT DOCUMENTS

| | | | |
|---|---|---|---|
| 4,808,776 | 2/1989 | Niwa et al. | 200/61.55 |
| 4,962,947 | * 10/1990 | Nagata et al. | 280/777 |
| 5,090,731 | * 2/1992 | Fujita et al. | 280/777 |
| 5,267,486 | * 12/1993 | Niwa et al. | 74/552 |
| 5,291,800 | * 3/1994 | Patselt et al. | 74/552 |
| 5,303,952 | 4/1994 | Shermetaro et al. | 280/731 |
| 5,410,114 | 4/1995 | Furuie et al. | 200/61.55 |
| 5,459,294 | 10/1995 | Danielson | 200/61.54 |
| 5,476,022 | * 12/1995 | Koyama et al. | 74/552 |
| 5,508,481 | 4/1996 | Williams et al. | 200/61.54 |
| 5,597,177 | 1/1997 | Matsuura | 280/731 |
| 5,650,600 | 7/1997 | Walters | 200/61.54 |
| 5,871,234 | * 2/1999 | Umemura et al. | 280/777 |
| 5,927,746 | 7/1999 | Komiya et al. | 280/728.2 |

FOREIGN PATENT DOCUMENTS 2-143734 12/1990 (JP) .
4-278861 10/1992 (JP) .
8-225051 9/1996 (JP) .

* cited by examiner

Primary Examiner—Lanna Mai
Assistant Examiner—Lynda Jasmin
(74) Attorney, Agent, or Firm—Intellectual Property Group Pillsbury Madison & Sutro LLP

(57) ABSTRACT

The horn switch assembly includes a fixed plate on a connector arm and a movable plate in an air bag module. When those plates are electrically continuous, a horn sounds. The movable plate is urged upward apart from the fixed plate. The movable plate is disposed such that a distance from the movable plate to the fixed plate is set at a fixed distance by two mounting bolts, screwed into the connector arm. Fore-spoke arm sections include torsional deformation parts, torsionally deformable, located outside the mounting seats of an air bag module. Back-spoke arm sections include first bending deformation parts located on the inner side of the mounting seats of the air bag module, and second bending deformation parts located on the outer side of the mounting seats and a column cover. The first bending deformation part has a lower bending rigidity than the second bending deformation part. A lower cover is made of synthetic resin, e.g., polypropylene, and includes a bottom wall portion and a circumferential side wall. On the back side of the lower cover, the upper end portion of the back side of the side wall of the lower cover is attached to the outer portions of the back-spoke arm sections.

6 Claims, 18 Drawing Sheets

STEERING WHEEL AND HORN SWITCH ASSEMBLY FOR THE STEERING WHEEL

This is a division of application ser. No. 09/007,772, filed Jan. 16, 1998 U.S. Pat. No. 6,079,737.

BACKGROUND OF THE INVENTION

1. Field of the Invention

The present invention relates to a vehicle steering wheel which has a horn switch assembly and an air bag module, the vehicle steering wheel can sufficiently absorb an impact force which acts on the back side of the ring portion of the steering wheel in the forward direction.

2. Description of the Related Art

A horn switch assembly which is arranged in a vehicle steering wheel while supporting an air bag module, is disclosed in Japanese Utility Model Publication No. Hei. 2-143734, Japanese Patent Publication No. Hei. 8-225051 or the like as shown in FIGS. 21 to 23.

In the above vehicle steering wheel W, horn switch mechanisms 200 are disposed on both sides of the air bag module 201 as shown in FIG. 23.

Each of the horn switch mechanisms 200 comprises an elongated movable plate 202 coupled with the air bag module 201, a fixed plate 203 coupled with the vehicle steering wheel body under the movable plate 202 and being in association with the movable plate 202, metal coiled springs 204 for upwardly urging the movable plate 202 apart from the fixed plate 203, and mounting bolts 205 which are screwed to a vehicle steering wheel body while engaging the movable plate 202 to put a distance from the fixed plate 203 to the movable plate 202 at a fixed distance.

Movable contacts 206 are provided at both ends of the movable plate 202, while fixed contacts are provided at both ends of the fixed plate 203 in association with the movable contacts 206, respectively.

The number of the mounting bolts 205 used in each of the horn switch mechanisms 200 is two. Those mounting bolts 205 are located near to both ends of said movable plate 202 and slightly closer to the center of said movable plate 202 than the locations of said movable contacts 206. The coiled springs 204 are respectively placed around the mounting bolts 205 while being coaxial with the mounting bolts 205.

The movable contacts 206 are located at both ends of the movable plate 202 in order to avoid such a state that the air bag module 201 is excessively declined to the depressing side of the air bag module, viz., a rolling of the air bag module 201 downward. To this end, a measure is used to prevent such a situation that after the movable contacts 206 are brought into contact with the fixed contacts 207 when the horn is operated, the depressing side of the air bag module 201 further descends. Let us consider a case where the movable contacts 206 are placed at positions on the movable plate 202, which are greatly apart from the urging means and the mounting bolts 205, not at both ends of the movable plate 202. In this case, after the movable contacts 206 are brought into contact with the fixed contacts 207, with progression of the deformation of the ends of the movable plate 202, the urging means is compressed, and the depressing side of the air bag module 201 will possibly descend (downward rolling).

The mounting bolts 205 and the coiled springs 204 are placed at the positions near to the movable contacts 206 located at the ends of the movable plate 202, in order to prevent an upward rolling of the air bag module 201. If the mounting bolts 205 and the coiled springs 204 are placed at positions that are located closer to the center of the movable and fixed plates 202, 203 and apart from the movable contacts 206, the side of the air bag module 201 opposite to the depressing side thereof is excessively inclined upward, viz., an upward rolling of the air bag module 201 tends to occur.

Further, the movable plate 202 includes a substantially rectangular base member 208 disposed above the fixed plate 203 and a mounting plate 209 extending upward from the edge of the central part of the base member 208 and being coupled with and supporting the air bag module 201 by connection bolts 210 to be screwed into the side surfaces of the air bag module 201. The movable plate 202 includes engaging holes 211 provided near to both ends of the base member 208.

The movable plate 202 is upward urged apart from the fixed plate 203 and the heads of two mounting bolts 205 to be screwed into the vehicle steering wheel body are brought into engagement with engaging holes 211 of the movable plate 202, whereby a distance from the movable plate 202 to the fixed plate 203 is put at a fixed distance.

Temporary fastening holes 214 are provided near to the center of the base member 208 of the movable plate 202 in order to temporarily fasten the air bag module 201 before the air bag module 201 is coupled with the mounting plate 209 by utilization of the connection bolts 210. To fasten, the engaging leg portions 213 extended from the air bag module 201 are inserted into the temporary fastening holes 214. In this case, the number of temporarily fastening holes 214 is two since two engaging leg portions 213 extended from the air bag module 201 are provided on each side of the air bag module 201. The engaging leg portions 213 are located closer to the center of the base member 208 than the engaging holes 211 so as not to interfere with the mounting bolts 205.

However, in the aforementioned conventional horn switch mechanisms, the two mounting bolts are screwed into the vehicle steering wheel body to which the fixed plate is fixed. The heads of those mounting bolts are brought into engagement with the edges of the engaging holes of the movable plate. Therefore, those mounting bolts must be electrically insulated from the base member of the movable plate. The insulating spacers 215, 216 are placed around the edges of the engaging holes, respectively. Two insulating spacers and two coiled springs corresponding in number to the number of the mounting bolts are used. This leads to an increase of the number of required component parts.

Actually, each of the two insulating spacers has two members, which are put on the upper and lower sides of each engaging hole. A total of four members are used for the insulating spacers.

A possible measure to reduce the number of the component parts is to use a single plate spring in place of the two coiled springs. However, the necessity of preventing a rolling of the air bag module when the horn is depressed makes it difficult to substitute one plate spring for the two coiled springs.

In the horn switch mechanisms, two holes for temporarily fastening the air bag module, provided in the base member of the movable plate, are located close to the center of the base member. For this reason, a temporary fastening strength of the air bag module is weak.

To fasten the air bag module by means of the connection bolts, the connection bolt of one of the horn switch mechanisms, disposed on both sides of the air bag module, is screwed into the corresponding threaded hole of the air bag module. Then, the connection bolt of the other horn switch mechanism is screwed into the corresponding threaded hole of the air bag module. The air bag module is easy to turn by a torque developed when the bolt is tighten into one of the threaded holes. The mounting plate to which the connection bolts are attached is disposed close to the center of the base member of the movable plate, and the temporary fastening holes for the air bag module are also formed close to the center of the base member. Therefore, the center (position of the connection bolt) of the torque of the air bag module is near to the temporary fastening hole. Therefore, the temporary fastening strength of the air bag module is weak.

A possible measure to increase the temporary fastening strength is to increase the length of the base member of the movable plate and to form the temporary fastening holes at locations near both ends of the elongated base member which correspond to the engaging leg portions of the air bag module. In this case, the movable contacts are located at positions greatly apart from and within both ends of the movable plate. When the horn is depressed, the ends of the movable plate are deformed after the movable contacts are brought into contact with the fixed contacts. The result is that the depressing side of the air bag module will possibly descend (downward rolling). For this reason, the measure is impracticable.

On the other hand, a vehicle steering wheel with an air bag module which can absorb an impact force which acts on the back side of the ring portion is disclosed in Japanese Patent Publication No. Hei. 4-278861.

The vehicle steering wheel W of the above publication is constructed as shown in FIG. 24 such that the back-spoke arm sections 217 are notched at a portion 218, and when an impact acts on the back-spoke arm sections, the back arm sections 217 are plastically deformed.

In this steering wheel, deforming means that is formed in the back-spoke arm section 217 is only one notch.

With this structure, when the notched back-spoke arm section is plastically deformed and comes in contact with the column cover located under the steering wheel, the deformation of the back-spoke arm sections is hindered, to thereby absorb the impact energy insufficiently.

Usually, a lower cover made of synthetic resin is disposed under the vehicle steering wheel. There is a chance that the back-spoke arm section comes in contact with the lower cover, and the impact energy absorption is hindered, even if it is made of synthetic resin.

SUMMARY OF THE INVENTION

Accordingly, to solve the aforementioned problems, an object of the present invention is to provide a a vehicle steering wheel which has a horn switch assembly without any rolling of the air bag module while reducing the number of component parts and a temporary fastening strength of an air bag module is increased, and which can sufficiently absorb an impact force which acts on the back side of the ring portion in the forward direction.

According to the present invention, there is provided a horn switch assembly for a steering wheel having an air bag module, comprising: a movable plate coupled with the air bag module; movable contacts provided near to both ends of the movable plate; a fixed plate coupled with a vehicle steering wheel body under the movable plate and having fixed contacts provided on the fixed plate so as to correspond to the movable contacts; a plate spring for supporting the under sides of both ends of the movable plate upwardly so as to urge the movable plate apart from the fixed plate upwardly; and means for regulating a distance from the fixed plate to the movable plate at inner and adjacent portions to the movable contacts of the movable plate while preventing the regulating means from interfering with the plate spring.

The above horn switch assembly preferably includes an insulating member for electrically insulating the mounting bolts from the movable plate, the insulating member including: sleeves provided so as to correspond to the engaging holes, the sleeves preventing the mounting bolts from contacting with the movable plates; and engaging protruded parts provided closer to ends of the insulating spacer than the sleeves so as to temporarily fasten the air bag module.

In the horn switch assembly constructed according to the present invention, the plate spring includes a mounting portion mounted on the center of the fixed plate, and two spring pieces which are extended from the mounting portion in the opposite directions and brought into contact with the under sides of both ends of the movable plate, and have through-holes through which the mounting bolts are inserted so as to prevent the spring pieces from interfering with the mounting bolts.

With provision of the through-holes, there is no fear that the plate spring interferes with the mounting bolts. Therefore, the spring pieces are extended up to the positions near to both ends of the movable plate without any obstacle, and support the movable plate at those positions. Further, there is no need of shifting the positions of the mounting bolts from the positions near to both ends of the movable plate.

The mounting bolts and the contact parts are placed near the movable contacts located at both ends of the movable plate. Therefore, the horn may be depressed without any rolling of the air bag module.

Provision of the through-holes of the plate spring for preventing it from interfering with the mounting bolts does not lead to a rolling of the air bag module. In the invention, the plate spring is symmetrical with respect to the center line thereof extending in its longitudinal direction. Therefore, the plate spring per se is not twisted when the horn is operated, and hence, the air bag module is not rolled.

Further, in the invention, there is no need of reducing the diameter of the mounting bolts. Therefore, a mounting strength of the air bag module to the vehicle steering wheel body is not impaired. Incidentally, the air bag module is attached to the vehicle steering wheel body by utilization of the mounting bolts of the horn switch assembly.

The urging means for urging upward the movable plate consists of one plate spring in order to reduce the number of required components parts. However, the air bag module is not rolled when the horn is operated, and the mounting strength of the air bag module onto the vehicle steering wheel body is not impaired.

In the conventional horn switch mechanism, the coiled springs are respectively placed around the mounting bolts while being coaxial with the mounting bolts, and hence, must push up the heavy air bag module. Therefore, those springs must be relatively long. This leads to an increase of the height of the horn switch mechanisms. On the other hand, in the horn switch assembly, the plate spring urges the urging means for urging upward the movable plate together with the air bag module. It is easy to obtain a large urging force by adjusting the thickness of the plate springs. Further, the height of the horn switch mechanisms may be reduced.

Therefore, the space within the vehicle steering wheel may be efficiently utilized. In a case where the connector arm is deformed by the self-aligning mechanism, the horn switch mechanisms interfere less with other members. In this respect, the horn switch mechanisms of the invention is well adaptable to the vehicle steering wheel provided with the self-aligning mechanism.

Also in the horn switch assembly of the invention, the under sides of the fixed plate around the fixed contacts are brought into contact with the vehicle steering wheel body. The strength to the deformation is improved in the portions of the fixed plate located near the fixed contacts of the fixed plate when the horn is operated. Incidentally, the conventional horn switch mechanism uses the coiled springs for urging upward the movable plate. Because of this, the height of the horn switch mechanisms is high. Further, the fixed contact provided on the fixed plate is raised. Therefore, the strength to the deformation is weak when the horn is operated.

Further, in the horn switch assembly of the invention, a member for electrically insulating the mounting bolts from the movable plate comprises a single elongated insulating spacer made of synthetic resin. The insulating spacer has sleeves at the locations corresponding to the engaging holes, the sleeves preventing the mounting bolts from contacting with the movable plates and being mounted on the upper surface of the base member of the movable plate.

Therefore, the number of component parts of insulating spacers for insulating the two mounting bolts from the movable plate, is reduced to one.

The insulating spacer includes engaging protruded parts respectively near to locations closer to the ends of the insulating spacer than the sleeves in order to temporarily fastening the air bag module before the connection bolts are screwed into the air bag module. The engaging protruded parts are elastically deformed to engage with the air bag module.

In the present invention, the engaging protruded parts of the insulating spacer for temporarily fastening the air bag module to the horn switch mechanisms are placed at positions closer to the ends of the insulating spacer than the sleeves, or the mounting bolts. In the prior technique, the temporary fastening holes are located at positions on the base member of the movable plate which are within the positions of the mounting bolts in order to avoid the interference of those fastening holes with the mounting bolts. When comparing with such prior technique, the present invention enables the engaging protruded parts for temporarily fastening the air bag module to be located further apart from the mounting plate at the central part of the base member. Therefore, the engaging protruded parts are brought into engagement with the stepped parts of the air bag module, and the distances from the centers (the positions of the connection bolts) of the torques of the air bag module to the engaging protruded parts are long. Therefore, small engaging forces of the engaging protruded parts can stand against large torques. The result is to secure an increased fastening strength of the air bag module.

In the above structure, the engaging forces of the engaging protruded parts may be reduced in a state that the fastening strength of the air bag module is increased. This makes it easy to temporarily fasten the air bag module to the horn switch mechanisms.

Therefore, in the horn switch assembly of the invention, the number of component parts of insulating spacers for insulating the two mounting bolts from the movable plate, is reduced to one. The result is to secure an increased fastening strength of the air bag module, and to make it easy to temporarily fasten the air bag module to the horn switch mechanisms.

Also in the invention, a plural number of engaging leg portions are protruded from the insulating spacer, the engaging leg portions being elastically deformed to engage with the movable plate. Therefore, the insulating spacer may stably be attached to the movable plate by utilization of the engaging leg portions. In this respect, this structure makes it easy to attach the insulating spacer to the movable plate.

Further, according to the present invention, there is provided a vehicle steering wheel provided with an air bag module and disposed above a column cover, comprising: a ring arm section circular in shape, a boss section disposed at a central portion of the ring arm section and connected to a steering wheel shaft, the air bag module being disposed above the boss section; and spoke sections interconnecting the boss section and the ring arm section, the spoke sections including two fore-spoke arm sections disposed on a fore side of the steering wheel and at least one back-spoke arm section disposed on a back side of the steering wheel, wherein the fore- and back-spoke arm sections respectively include fore- and back-inner portions extending from the boss section in a direction substantially perpendicular to an axis of the boss section, and fore- and back-outer portions extending upwardly and outwardly from the fore- and back-inner portions up to the ring arm section, and the air bag module is fixed to the fore- and back-inner portions of the fore- and back-spoke arm sections, and wherein the fore-spoke arm sections include a torsional deformation part being provided closer to the ring arm section than a mounting portion of the air bag module, and the at least one back-spoke arm section includes a first bending deformation part being provided in the back-inner portion closer to the boss section than the mounting portion of the air bag module, and a second bending deformation part being provided closer to the ring arm section than the column cover and the mounting portion of the air bag module, the first bending deformation part having a lower bending rigidity than the second bending deformation part.

The above vehicle steering wheel preferable includes a lower cover being disposed above the column cover and on a lower side of the boss section and the spoke sections, the lower cover including: a bottom wall being located under the fore- and back-inner portions of the fore- and back-spoke arm sections; and side wall extending obliquely and upwardly from a circumferential edge of the bottom wall up to a middle of the fore- and back-outer portions of the fore- and back-spoke arm sections, wherein an upper end portion of a back side of the side wall is attached to the back-outer portion of the back-spoke arm section.

In the vehicle steering wheel of the invention, when an impact force acts on the back side of the ring portion in the forward direction, the torsional deformation parts of the fore-spoke arm sections are progressively deformed, and the first and second bending deformation parts are plastically deformed. The ring portion surface vertically moves.

This deformation prevents the air bag module from unnecessarily protruding from the ring portion surface. The reason for this follows. The first bending deformation parts are each located closer to the boss arm section than the mounting seat of the air bag module. Therefore, when the ring portion surface moves with progression of the deformation of the torsional deformation parts, the mounting seats of the air bag module in the back-spoke arm sections also move. Accordingly, the upper surface of the pad of the air bag module may be moved following the ring portion surface.

Thereafter, if the back spokes interfere with the column cover through the bottom wall portion of the lower cover, the second bending deformation parts of the back-spoke arm sections are located closer to the ring arm section than the column cover, and the second bending deformation parts are plastically deformed and bent, and the ring portion surface further moves in the vertical direction.

Additionally, the first and second bending deformation parts of the back-spoke arm sections are deformed. In this case, those may be deformed with a little resistance. Accordingly, it does not hinder the deformation of the back-spoke arm sections. The reason for this follows. When the bending deformation parts are deformed, the back side of the bottom wall portion of the lower cover first comes in contact with the column cover. In the back side of the lower cover, the upper end portion of the side wall is fastened to the outer portions of the back-spoke arm sections. A distance from the portion of the bottom wall portion where it is in contact with the column cover to its mounting position to the back-spoke arm sections is long.

Thereafter, the deformation of the first and second bending deformation parts of the back-spoke arm sections progresses in a state that the bottom wall portion is in contact with the column cover. With the deformation, the inner portions and the outer portions of the back-spoke arm sections move toward the bottom wall portion of the lower cover. At this time, the under sides of the inner portions of the back-spoke arm sections rise, and the large gap is present between each inner portion and the bottom wall portion, so that the abutting of the back-spoke arm sections against the lower cover retards. As a result, a hindrance of the deformation of the back-spoke arm sections by the lower cover is minimized.

In the vehicle steering wheel of the invention, when an impact force acts on the back side of the ring portion in the forward direction, the torsional deformation parts of the fore-spoke arm sections are progressively deformed, and the back-spoke arm sections plastically deform the first and second bending deformation parts. Thus, the deformation progresses in two successive steps. At this time, the second bending deformation parts may be deformed without any interference with the column cover. Therefore, a deformation stroke of the back-spoke arm sections may be set to be large. A hindrance of the deformation of the back-spoke arm sections by the lower cover is minimized. Therefore, an affect by the lower cover can be suppressed. The energy of the impact force can be absorbed sufficiently.

In the embodiment, the lower cover is attached to the back-spoke arm sections by utilization of the engaging legs that are elastically deformed to be brought into engagement with the back-spoke arm sections from the lower side. Therefore, when the bottom wall portion interferes with the column cover, the back side of the side wall is pushed in the direction opposite to the direction of the engaging of the engaging legs, viz., in the upward direction. In other words, without any increase of a deformation load of the lower cover, the side wall of the lower cover may be removed from the back-spoke arm sections. For this reason, the hindrance of the deformation of the back-spoke arm sections by the lower cover is further reduced.

In the invention, the deformation auxiliary means which facilitates the deformation of its near portion with the reduced thickness, are formed near the back-spoke arm sections of the lower cover. When the bottom wall portion interferes with the column cover and the back-spoke arm sections, the periphery of the mounting portions to the back-spoke arm sections, are easily deformed with the aid of the deformation auxiliary means. Therefore, the hindrance of the deformation of the back-spoke arm sections by the lower cover is further reduced.

DETAILED DESCRIPTION OF THE PREFERRED EMBODIMENTS

The preferred embodiment of the present invention will be described with reference to the accompanying drawings.

Reference is made to FIGS. 1 to 4. A horn switch assembly consisting of horn switch mechanisms 30, which is constructed according to the present invention, is assembled into a vehicle steering wheel W. The vehicle steering wheel W includes a ring portion R shaped circular, a boss portion B disposed at the central portion of the ring portion R, and four spoke portions S interconnecting the boss portion B and the ring portion R. An air bag module 8 is disposed in the upper portion of the boss portion B. The air bag module 8 is located above the vehicle steering wheel body 1 while the under sides of both ends of the air bag module 8 are supported by the horn switch mechanisms 30. Here, the vehicle steering wheel body 1 indicates a portion of the vehicle steering wheel W except the air bag module 8 and the horn switch mechanisms 30.

Figure 1:
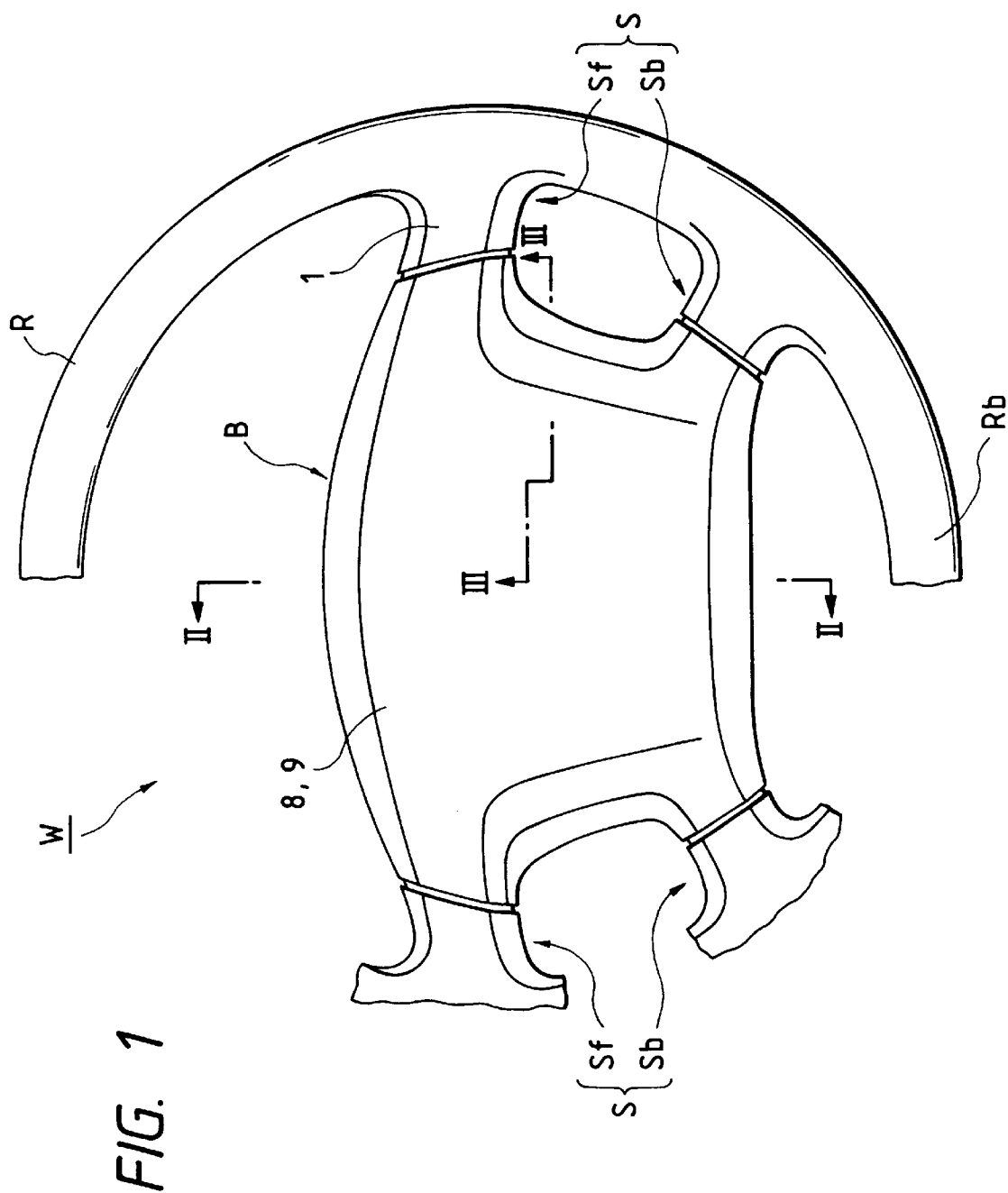
FIG. 1 is a plan view showing a vehicle steering wheel with a horn switch mechanism according to the present invention.
Figure 2:
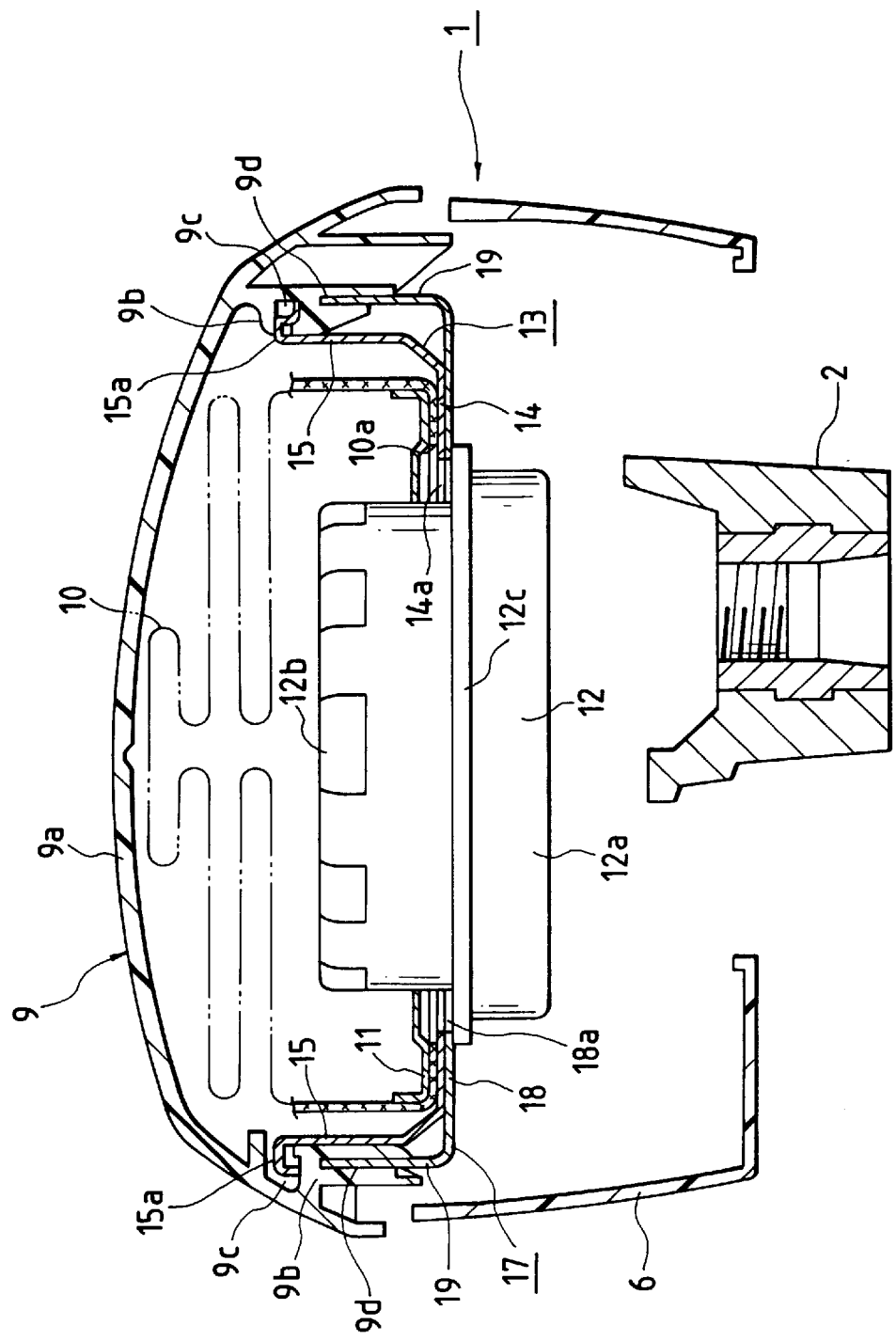
FIG. 2 is a cross sectional view taken along line II—II in FIG. 1.
Figure 4:
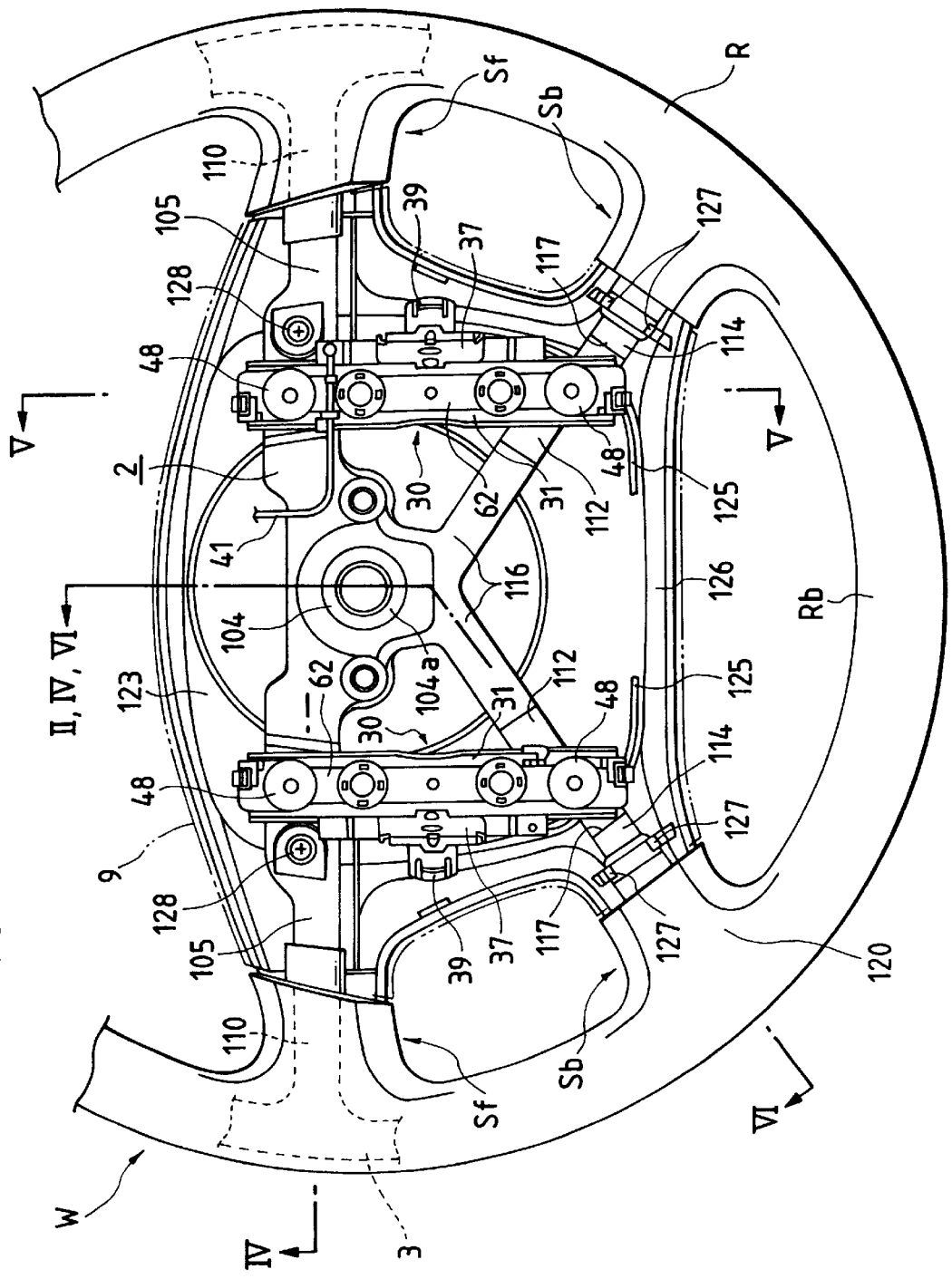
FIG. 4 is a plan view showing the steering wheel after an air bag module is removed.
Figure 10:
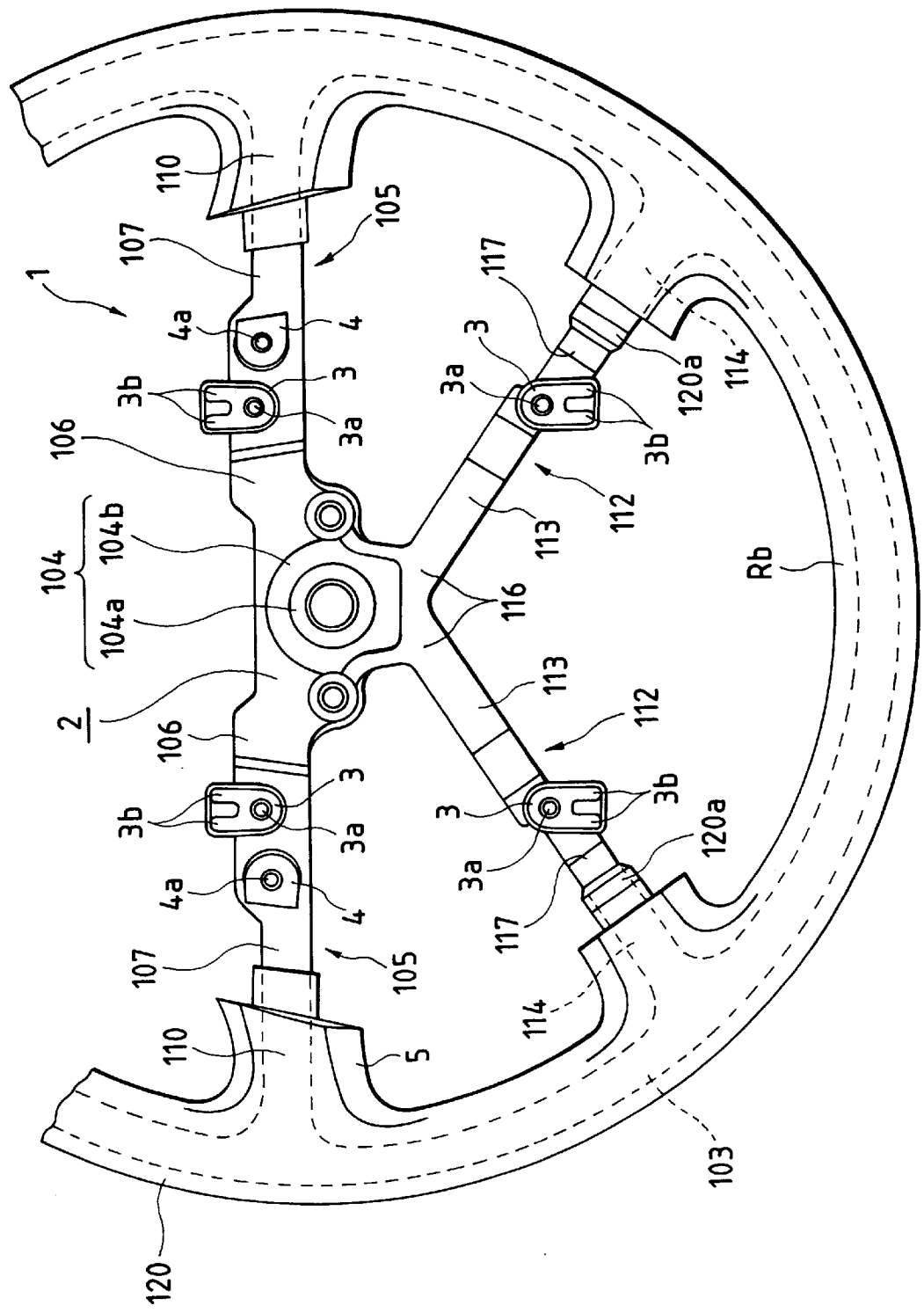
FIG. 10 is a plan view showing a column of the vehicle steering wheel body.

As shown in FIGS. 2, 4 and 10, the vehicle steering wheel body 1 includes a metal connector arm 2 interconnecting the ring portion R, boss portion B and spoke portions S, a coating layer 5 made of synthetic resin, which covers the ring portion R, spoke portions S and the connector arm 2, and a lower cover 6 made of synthetic resin. Mounting seats 3 and mounting seats 4 are provided on the boss portion B of the connector arm 2, as shown in FIG. 10. The mounting seats 3 have mounting holes 3a used for mounting the horn switch mechanisms 30. The mounting seats 4 have mounting holes 4a used for mounting the lower cover 6.

The lower cover 6 is fastened to the connector arm 2 in a manner that screws (not shown) are screwed into the mounting holes 4a of the mounting seats 4, and engaging legs 127 are hooked on the spoke portions S of the coating layer 5.

Figure 3:
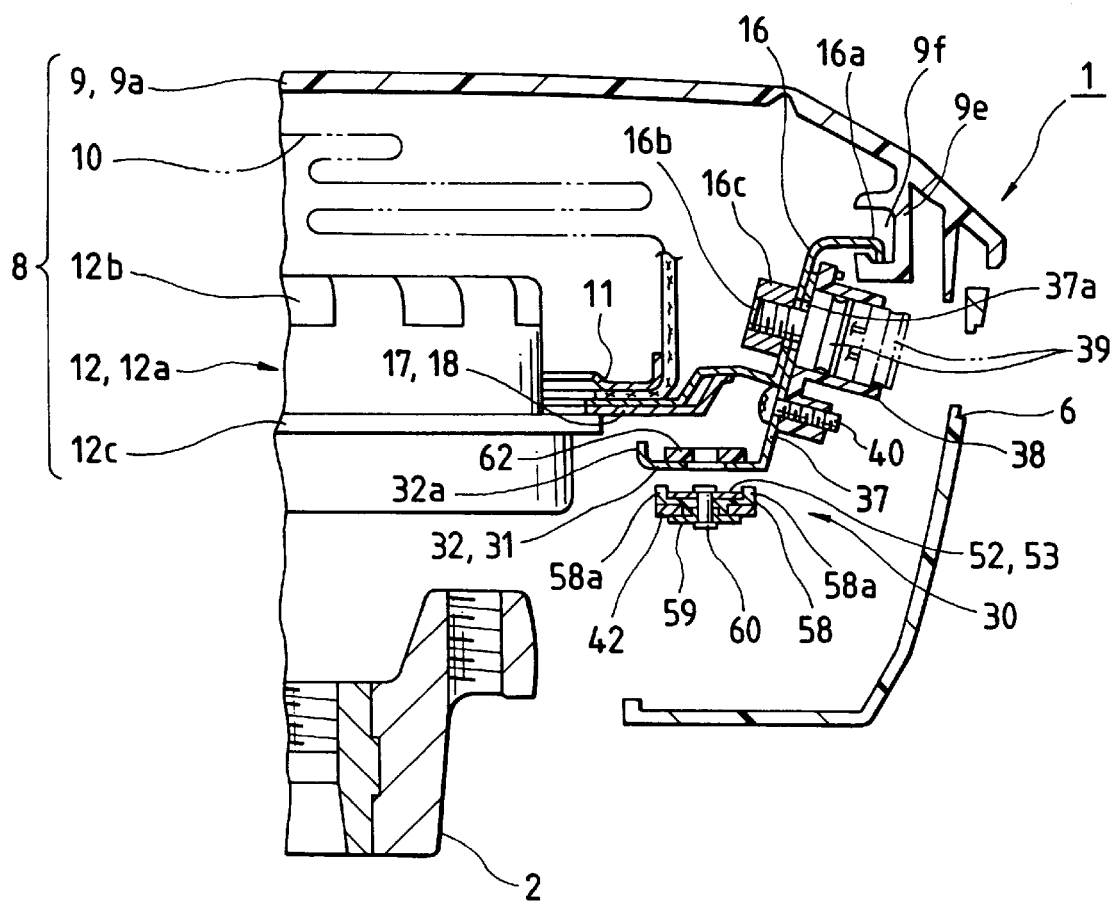
FIG. 3 is a cross sectional view taken along line III—III in FIG. 1.

The air bag module 8, as shown in FIGS. 2 and 3, includes a cover 9, an air bag 10, an inflator 12, a bag holder 13, and an assembling plate 17.

The cover 9 made of synthetic resin includes a major portion 9a, side portions 9b extending downward from the front and rear circumferential edges of the major portion 9a, and side portions 9e extending downward from the right and left circumferential edges of the major portion 9a. The major portion 9a covers the folded air bag 10. A thin, breakable part (not shown) is formed in the major portion 9a of the cover. When the air bag 10 is inflated, the breakable part is broken to allow the air bag 10 to break out of the cover means. Engaging grooves 9c and insertion grooves 9d are provided on the side portions 9b. The cover means 9 is fastened to the bag holder 13 and the assembling plate 17 by means of the engaging grooves 9c and the insertion grooves 9d. Engaging grooves 9f are provided on the side portions 9e.

The air bag 10 is a bag-like container with a gas inflow port 10a which is placed in the air bag module 8 while being folded.

The inflator 12 includes a main body 12a and a flange 12c extended outwardly of the main body 12a. The main body 12a, shaped like a circular cylinder, has gas outflow ports 12b provided in the upper portion.

As shown in FIGS. 2, 3, 11 and 12, the bag holder 13, formed with a sheet metal, includes a bottom wall portion 14, side wall portions 15 extending upward from this side and the other side (with respect to the paper of the drawing) of the bottom wall portion 14, and side wall portions 16 extending upward from the right and left sides of the bottom wall portion. The bottom wall portion 14, substantially rectangular in shape, has an opening 14a. The main body 12a may be put into the bag holder 13 through the opening 14a, from the lower side.

Figure 5:
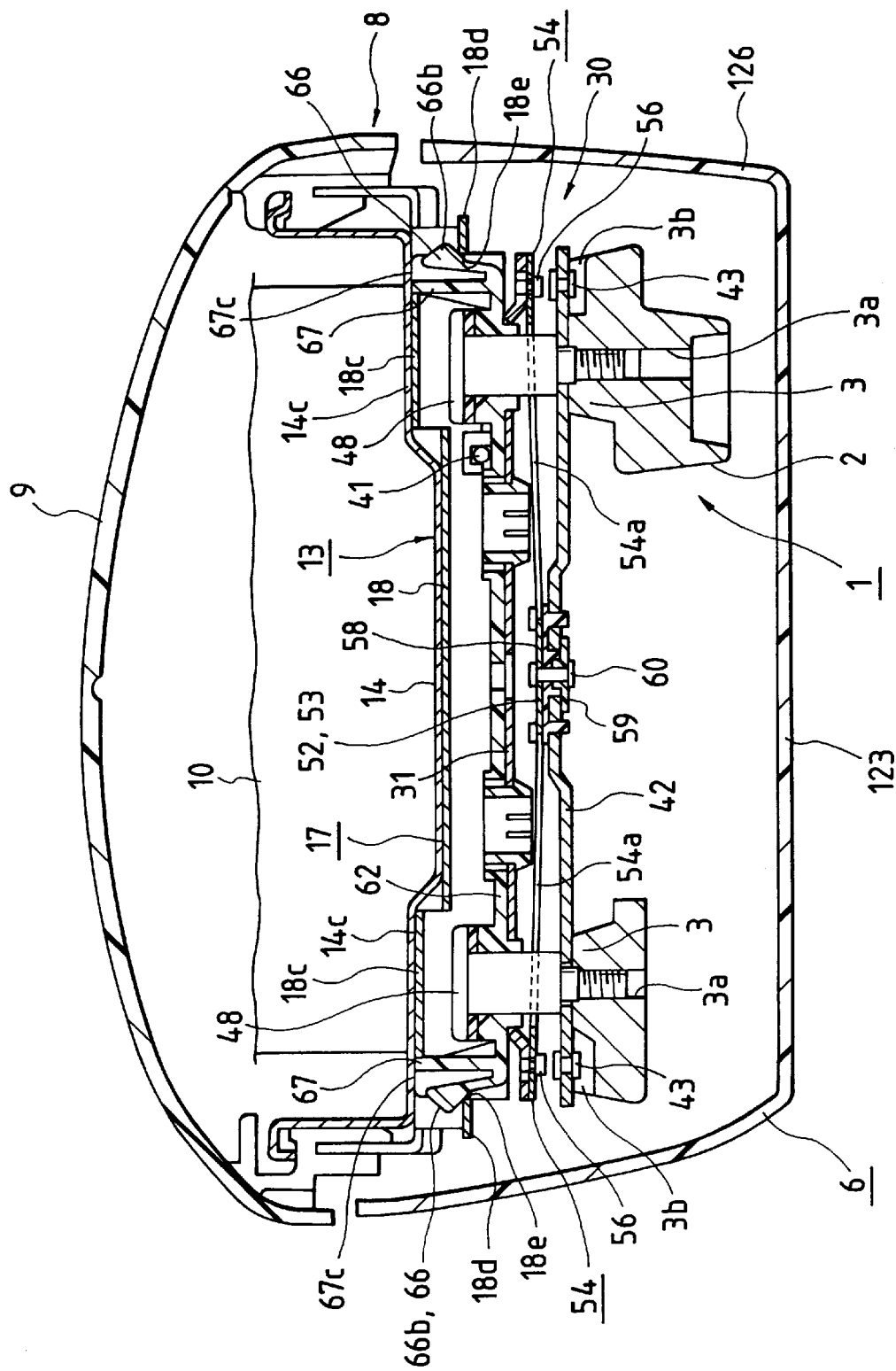
FIG. 5 is a cross sectional view showing the steering wheel, taken along line V—V in FIG. 4.
Figure 11:
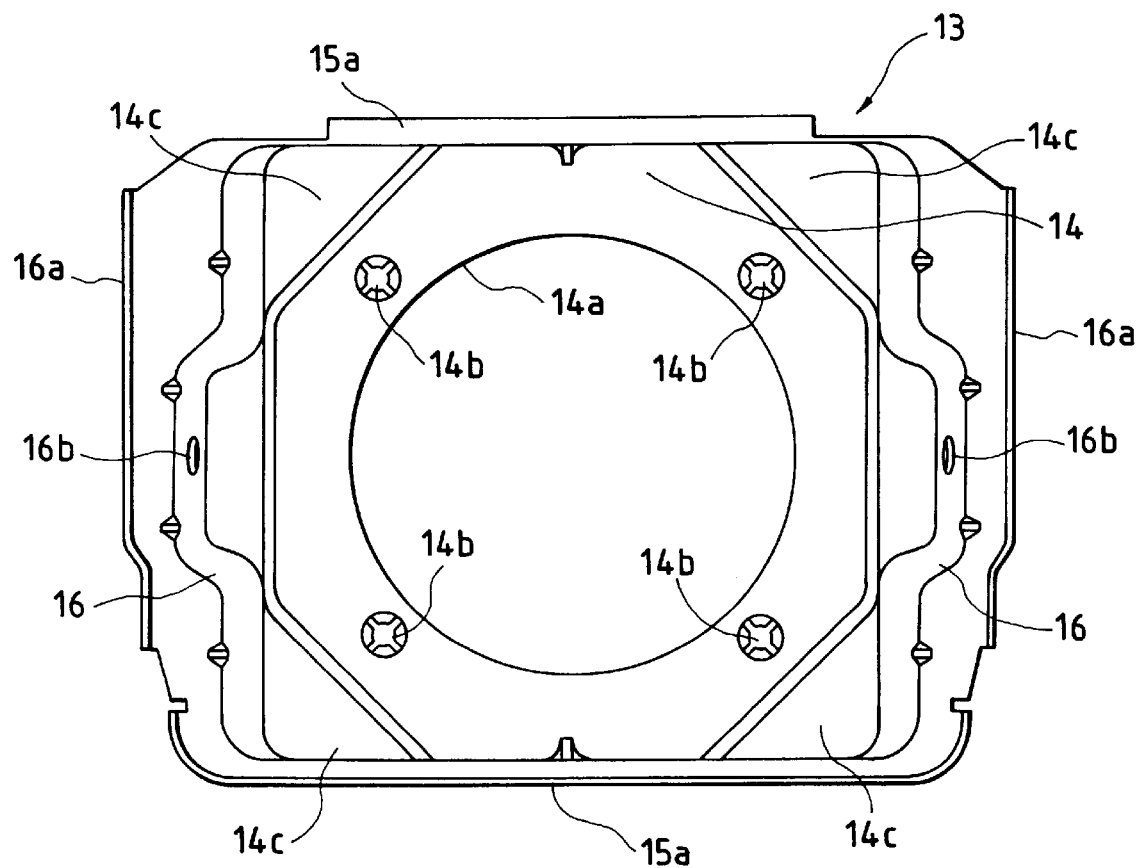
FIG. 11 is a bottom view showing a bag holder used for the air bag module in the embodiment of the present invention.
Figure 12:
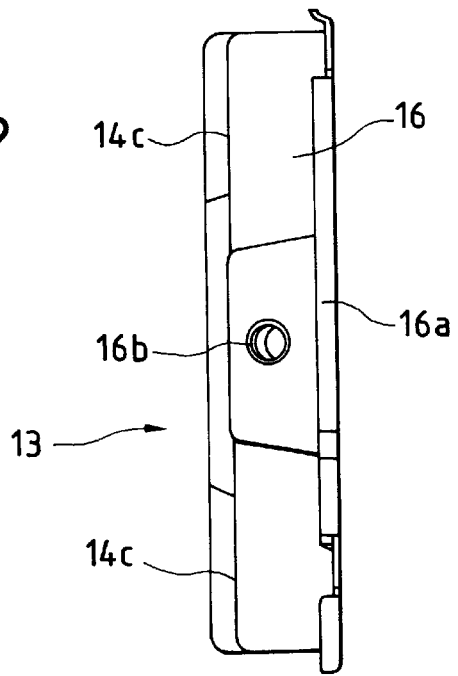
FIG. 12 is a side view showing the bag holder.

Four insertion holes 14b are formed around the opening 14a of the bottom wall portion 14. Bolts, not shown, extended from a retainer 11 described hereinafter are inserted into those insertion holes 14b. Further, lands or engage parts 14c are provided at four corners of the bottom wall portions 14 while being raised from the circumferential edge of the opening 14a as shown in FIGS. 5, 11 and 12.

Engaging hooks 15a and 16a are formed atop the side wall portions 15 and 16, respectively. Those engaging hooks are inserted into the engaging grooves 9c, 9f of the side portions 9b, 9e of the cover 9. Threaded holes 16b with nuts 16c fixed thereat are formed in the mid positions (when vertically viewed) of the side wall portions 16. Bolts 39 are screwed into the threaded holes 16b, whereby the horn switch mechanisms 30 support the air bag module 8.

The assembling plate 17 of a metal sheet, as shown in FIGS. 2, 3, 13 and 14, includes a bottom wall portion 18, side wall portions 19, and side wall portions 20 and 21. The bottom wall portion 18, substantially rectangular in shape, has an opening 18a through which the inflator main body 12a is put into the bag holder from the lower side. The side wall portions 19 extend upward from front and rear sides of the bottom wall portion 18, and the upper ends of the side wall portions 19 are inserted into the insertion grooves 9d of the side portions 9b of the cover. The side wall portions 20 and 21 upward extend from the right and left sides of the bottom wall portion 18. The side wall portions 20 and 21 are disposed outside the right and left side walls 9e of the cover means 9, while being spaced from the latter, and connection bolts 39 are inserted therebetween.

Figure 13:
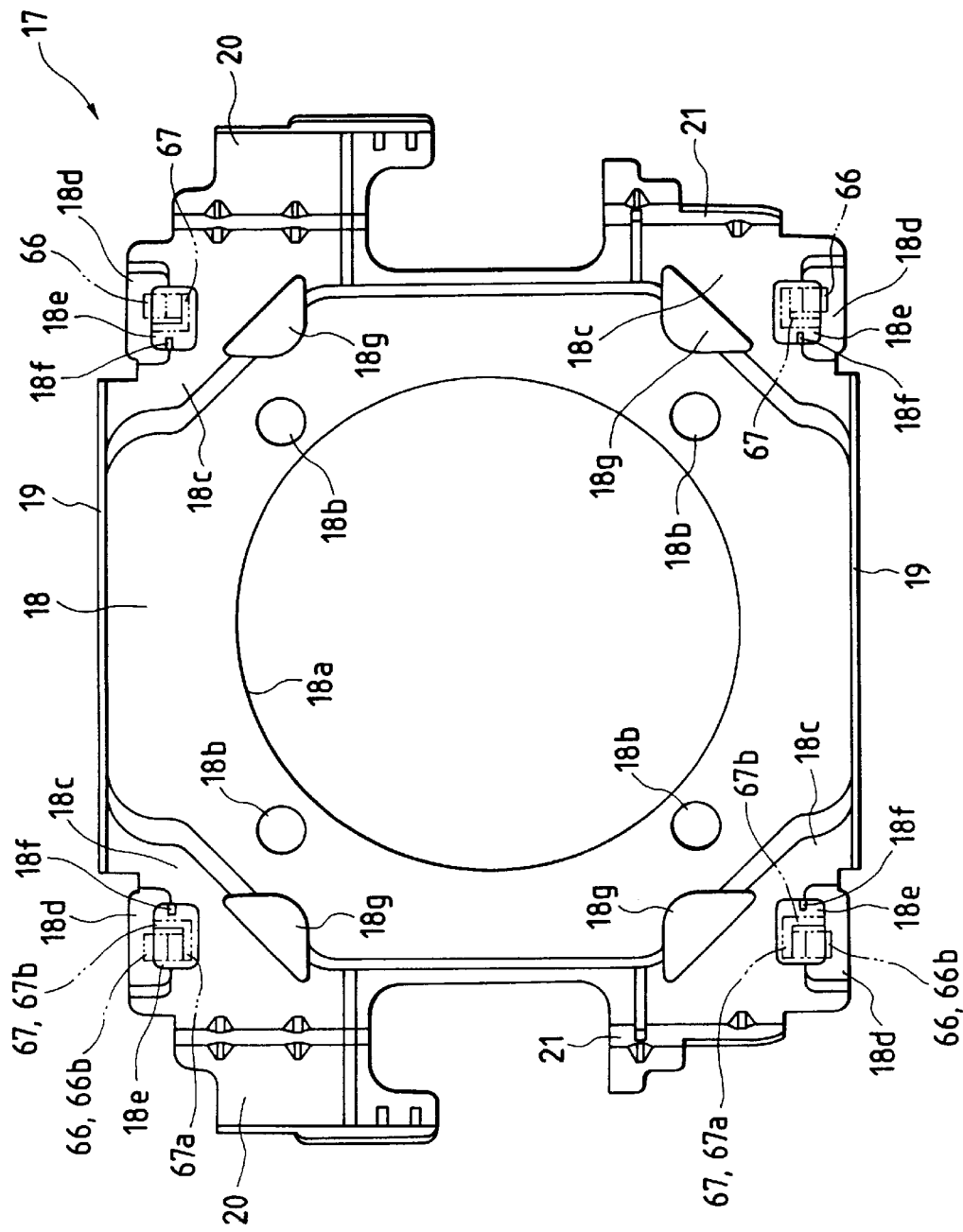
FIG. 13 is a plan view showing an assembling plate used for the air bag module.
Figure 14:
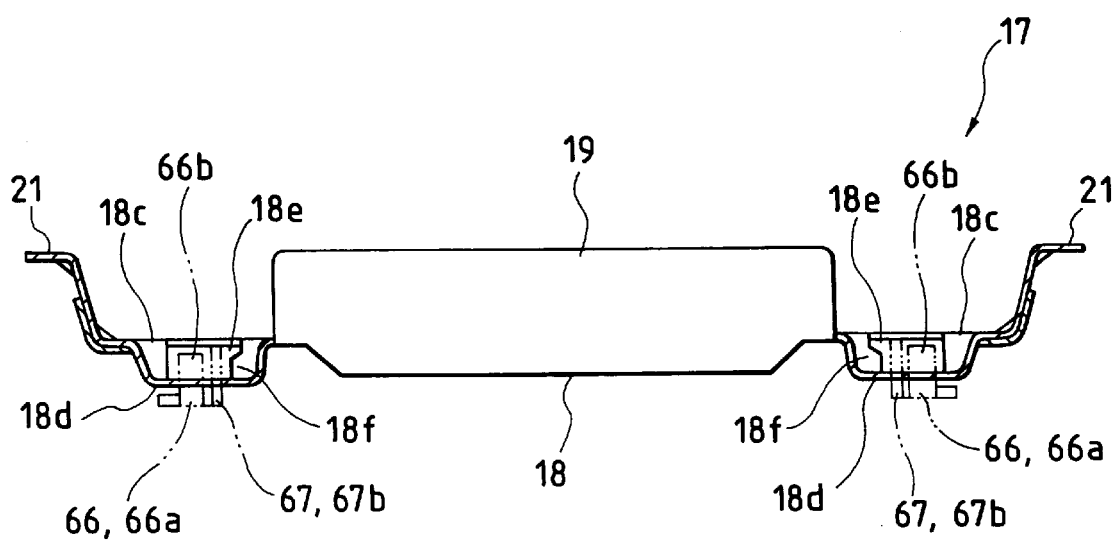
FIG. 14 is a plan view showing the assembling plate whose rear side is omitted.

The bottom wall portion 18 includes four insertion holes 18b arrayed around the opening 18a of the bottom wall portion 18. Bolts, not shown, are inserted into those insertion holes 18b. Lands or engaging parts 18c are provided at four corners of the bottom wall portion 18 while being raised from the circumferential edge of the opening 18a (FIGS. 5, 13 and 14). Stepped parts 18d are respectively located outside and lower than the engaging parts 18c. A through-hole 18e, rectangular in shape when viewed from above, is formed between the stepped part 18d and the corresponding engaging part 18c. A protrusion 18f is formed at a position located closer to the center of the assembling plate 17 within a space defined by the inner walls of each through-hole 18e.

The engaging protruded parts 66 and the positioning protruded parts 67, which are protruded from both ends of an insulating spacer 62 which will be described later, are inserted into each of the through-holes 18e. In this case, the engaging protruded parts 66 are brought into engagement with the stepped parts 18d. In the air bag module 8, the through-holes 18e and the stepped parts 18d form structures for temporarily fastening the air bag module 8.

An escape hole 18g is formed near to the opening 18a of each engaging parts 18c at the four corners of the bottom wall portion 18. The escape holes 18g are each triangle in shape when viewed from above. Those escape holes 18g prevent the heads 49 of mounting bolts 48 (to be given later) from interfering with the circumferential edge of the openings 18a of the bottom wall portion 18.

The air bag 10 and the inflator 12 are mounted on the bag holder 13 and the assembling plate 17 by a metal retainer 11 with a plurality of bolts (not shown). To be more specific, the retainer 11 holds the edge of the gas inflow port 10a of the air bag 10. In this state, the bolts (not shown) are inserted into the edge of the gas inflow port 10a, insertion holes 14b of the bottom wall portion 14 and the insertion holes 18a of the bottom wall portion 18, and the flange 12c of the inflator, and tightened, whereby the air bag 10 and the inflator 12 are assembled into the bag holder 13 and the assembling plate 17. At this time, the side portions 9b, 9e of the cover 9 are also tightly held by the bag holder 13 and the assembling plate 17.

As shown in FIG. 4, two horn switch mechanisms 30 are disposed on both sides of the air bag module 8 in this embodiment. Those horn switch mechanisms 30 are equal in construction except that the horn switch mechanism on the right-hand side is connected to a lead wire 41.

Figure 6:
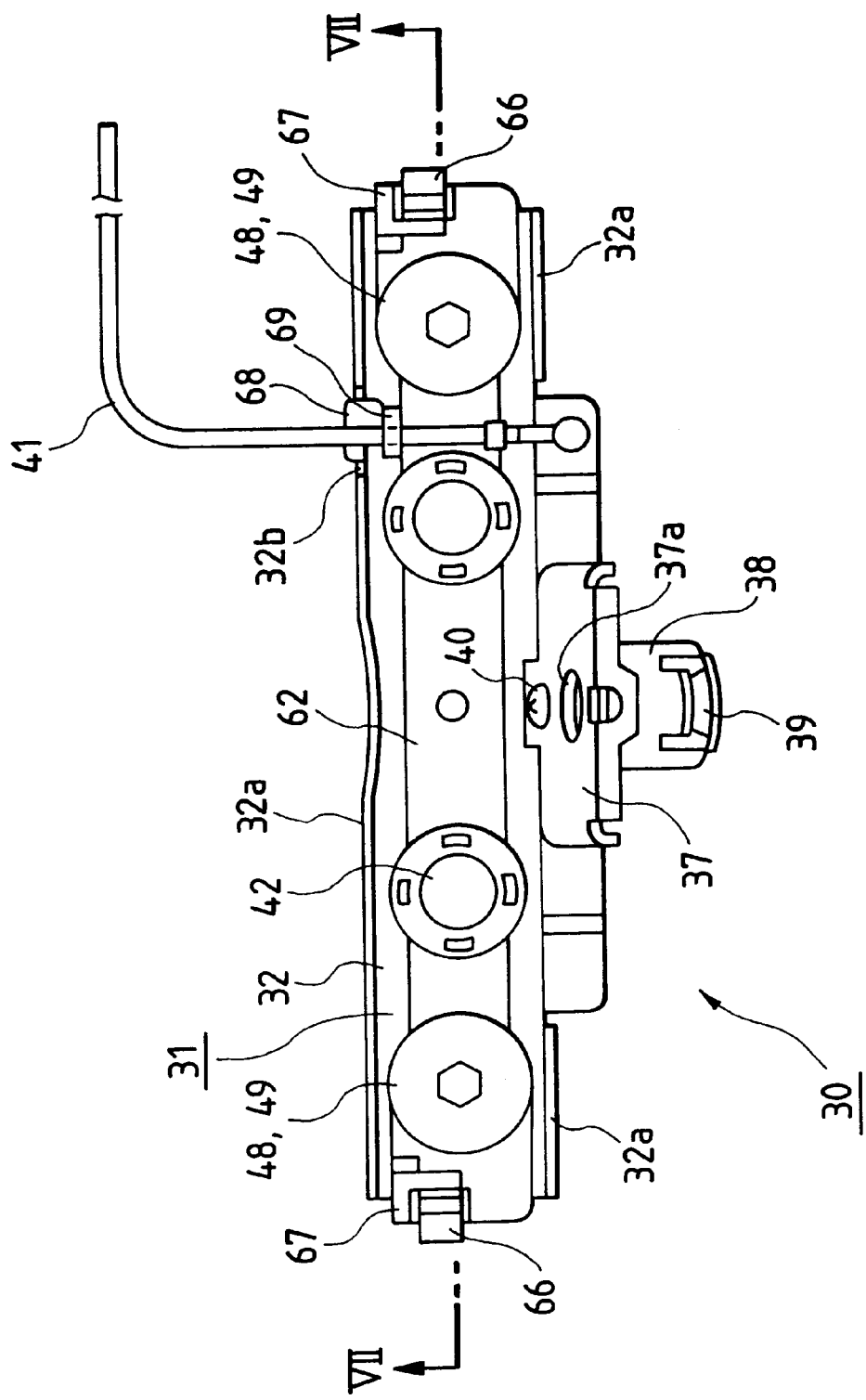
FIG. 6 is a plan view showing the horn switch mechanism incorporated into the steering wheel.
Figure 7:
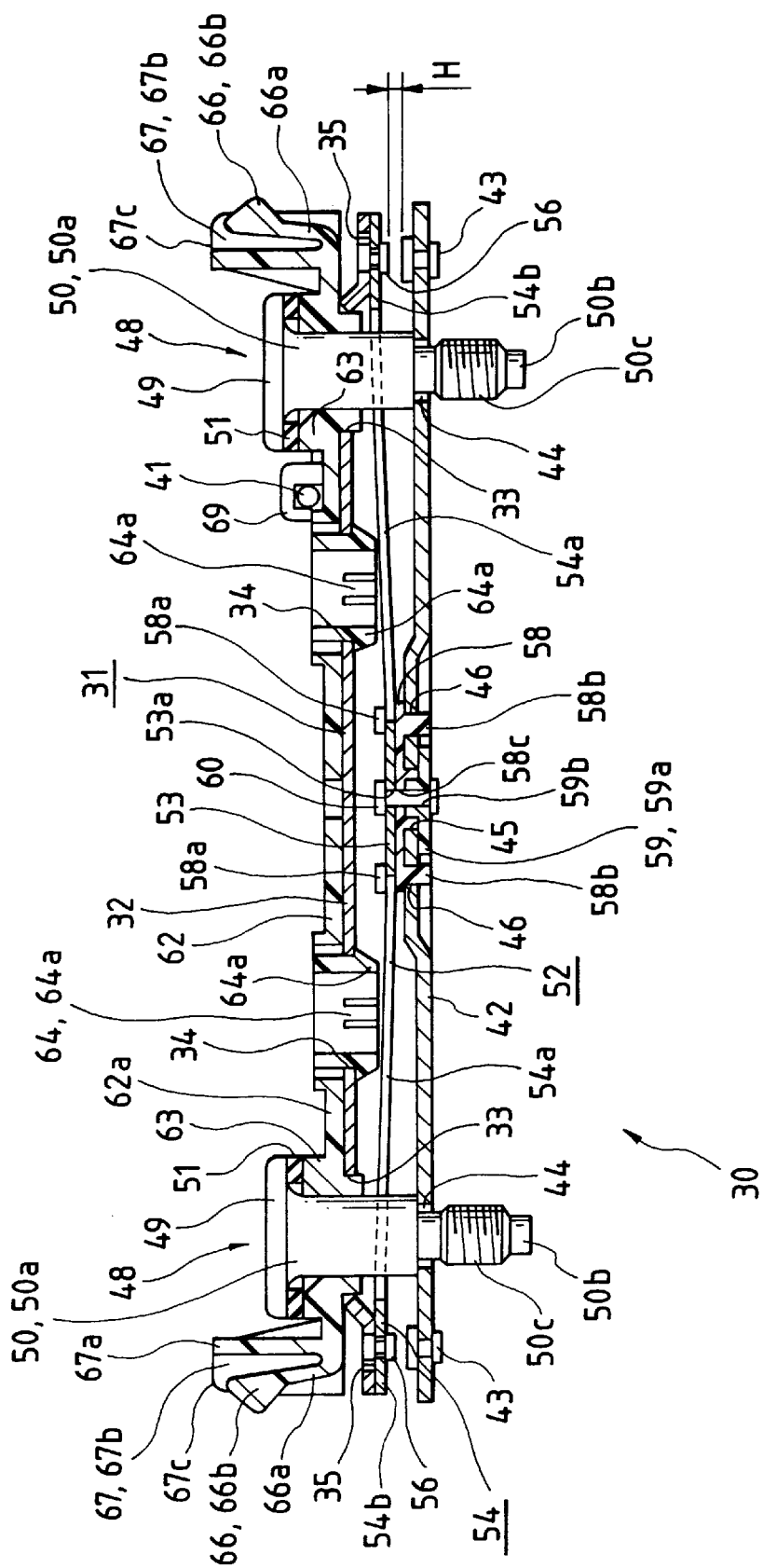
FIG. 7 is an enlarged cross sectional view taken along line VII—VII in FIG. 6.

The each horn switch mechanism 30, as shown in FIGS. 6 and 7, includes a movable plate 31, a fixed plate 42, two mounting bolts 48, a plate spring 52, and insulating spacers 58, 59 and 62. The plate spring 52 upwardly urges the movable plate 31.

The movable plate 31 of a metal sheet, as shown in FIGS. 3, 6 and 7, includes a base member 32 shaped like a narrow rectangular plate, and a mounting plate 37, which extends obliquely and upwardly from the mid position of the base member 32 to be coupled with the air bag module 8.

The base member 32 has through-holes 35 formed at both ends thereof. Movable contacts 56 are provided at the through-holes 35, respectively. Engaging holes 33 are formed at locations of the base member 32 that are closer to the center thereof than the through-holes 35. Engaging holes 34 are further formed at locations of the base member 32 that are closer to the center thereof than the through-holes 35. The inner circumferential edge of each of the engaging holes 33 engages the head 49 of the mounting bolt 48 while a buffering member 51 and the sleeve 63 of the insulating spacer 62 are is located therebetween. An engaging leg portion 64 of the insulating spacer 62 is inserted into each of the engaging holes 34. Reinforcing ribs 32a are formed along both sides of the base member 32 except the portion of the mounting plate 37. A recess 32b is formed in a predetermined location of each of the reinforcing ribs 32a. A support 68 of the lead wire 41 in the insulating spacer 62 is disposed in the recess 32b.

An insertion hole 37a is formed in the mounting plate 37. The connection bolts 39 to be screwed into the threaded holes 16b of the air bag module 8 is inserted into the insertion hole 37a. Attachments 38 for temporarily fastening the bolts 39 are firmly attached to the mounting plate by means of screws. The connection bolts 39 are temporarily fastened to positions indicated by a two-dot chain line in FIG. 3.

The lead wire 41 is attached to the right-hand horn switch mechanisms 30 by means of rivets (FIG. 4). The lead wire 41 is electrically continuous to the positive terminal of a horn drive circuit. The positive terminal of the horn drive circuit is electrically continuous to the movable plate 31, plate spring 52, movable contact 56, and bag holder 13 by way of the lead wire 41. In the left-hand horn switch mechanisms 30, the movable plate 31, plate spring 52 and movable contact 56 are electrically connected through the bag holder 13 to the positive terminal of the horn drive circuit.

The fixed plate 42 located under the movable plate 31 is shaped like a long metal sheet equal in length to the movable plate 31. Fixed contacts 43 are provided at both ends of the fixed plate 42. Mounting holes 44 are formed in the fixed plate 42 at locations closer to the center of the fixed plate than the fixed contact 43, respectively. Each of the mounting holes 44 is threaded one or two turns at its portion corresponding to a male screw part 50c of the reduced or small diameter part 50b of a shaft 50 of the mounting bolt 48. To handle the horn switch mechanisms 30 in the form of an assembly, each mounting hole 44 is threaded. Specifically, the insulating spacers 58, 59 and 62, and the buffering members 51 are included, the plate spring 52 is located between the plates 31 and 42, the mounting bolts 48 are each inserted into the predetermined locations, the male screw part 50c of each mounting bolt 48 is screwed into the corresponding mounting hole 44 till its tip is protruded from the mounting hole 44.

When the large diameter parts 50a of the shafts 50 of the mounting bolts 48 are screwed into the mounting holes 3a of the mounting seats 3, respectively, the fixed plate 42 is pressed with the end faces of the large diameter parts 50a to be fixed onto the connector arm 2.

The central portions of the fixed plate 42 are slightly curved upward, and through-holes 45 are formed in the upward curved portion. Those holes 45 are used for mounting the plate spring 52. Positioning holes 46 are formed near to those through-holes 45.

The fixed plate 42 and the fixed contact 43 are electrically connected to the negative terminal of the horn drive circuit by way of the connector arm 2.

Figure 8:
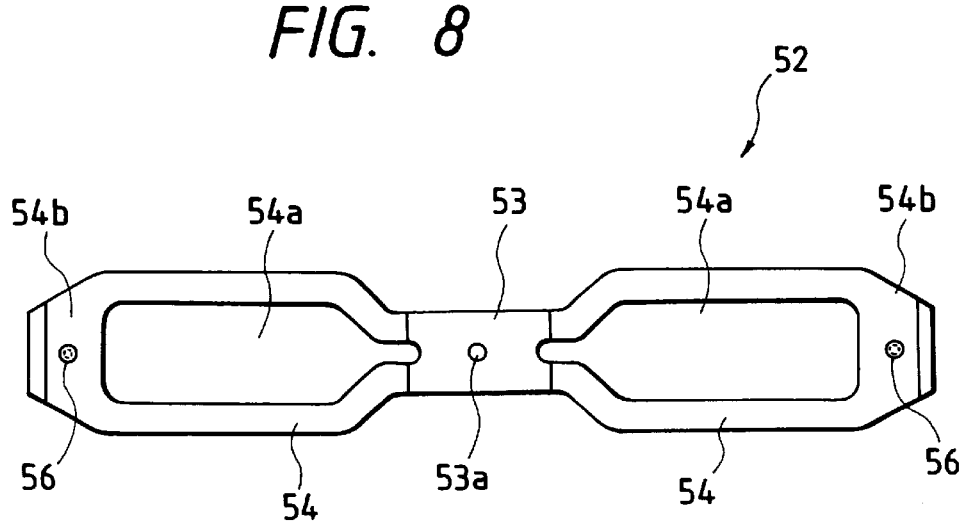
FIG. 8 is a plan view showing a plate spring of the horn switch mechanism.
Figure 9:
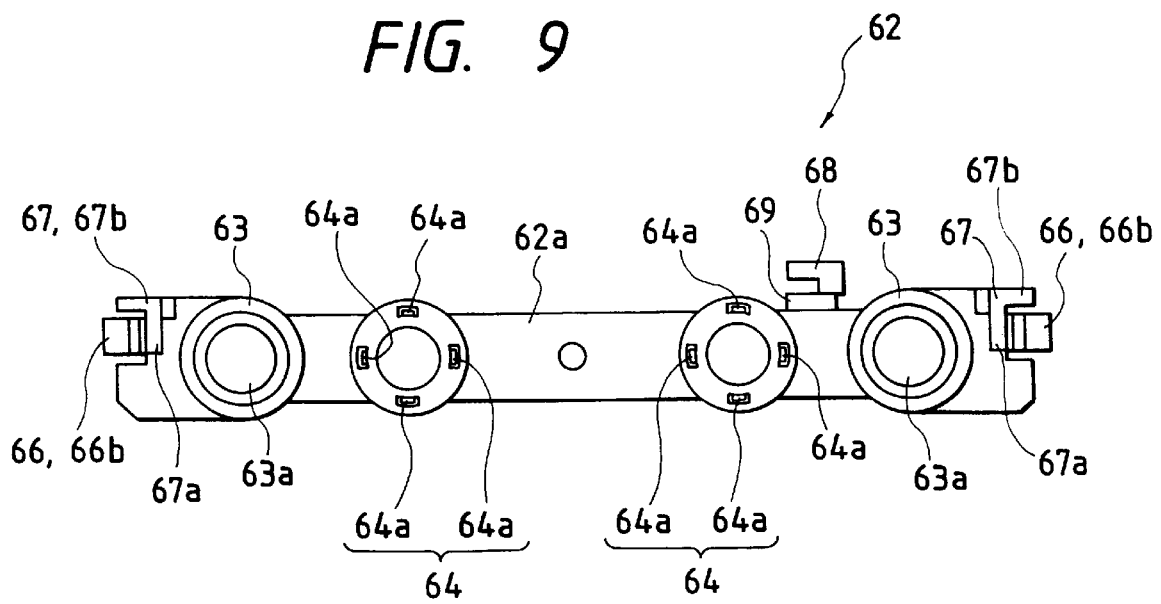
FIG. 9 is a plan view showing an insulating spacer of the horn switch mechanism.

The plate spring 52 is made of spring steel and its length when viewed in the longitudinal direction is equal to the length of the base member 32 of the movable plate 31, as shown in FIG. 5, 7 and 8. The plate spring 52 is elongated while being symmetrical with respect to the center line thereof extending in its longitudinal direction. Further, the plate spring 52 includes spring pieces 54 extending from a mounting portion 53 in the opposite directions.

A mounting hole 53a is formed in the central portion of the mounting portion 53. A rivet 60 is inserted into the mounting hole 53a to fix the plate spring 52 to the fixed plate 42.

Through-holes 54a are formed in the spring pieces 54, respectively. The mounting bolts 48 are respectively inserted into the through-holes 54a without any interference between those bolts. The spring pieces 54 are extended obliquely and upward in a state that contact parts 54b of the spring pieces 54 are respectively pressed against the under sides of both ends of the insulating spacer 62.

In the present embodiment, the through-holes 54a are large enough to prevent one of the mounting bolts 48 from interfering the corresponding engaging leg portion 64 of the insulating spacer 62 as well as the other mounting bolt 48.

The movable contacts 56 are provided on the contact parts 54b of the spring pieces 54, respectively, while corresponding to the fixed contacts 43 of the fixed plate 42. It may be also possible that the movable contacts 56 are provided on portions of the movable plate 31 corresponding to the through holes 35, and other through holes are provided on the contact parts 54b of the spring pieces 54 such that the movable contacts 56 provided on the movable plate 31 can be brought into contact with the fixed contacts 43.

Two insulating spacers 58 and 59 made of insulating material, e.g., polyacetal, are used for mounting the plate spring 52 on the fixed plate 42 to electrically insulating the plate spring 52 and the rivet 60 from the fixed plate 42. A total of four protrusions 58a are provided on the upper side of the insulating spacer 58. Those protrusions 58a engage both ends of the mounting portion 53 and fix them (FIGS. 3 and 7). Protrusions 58b are provided on the under side of the insulating spacer 58. Those protrusions are inserted into the positioning holes 46 of the fixed plate 42, respectively. The insulating spacer 59 is provided with a flange portion 59a, which comes in contact with the circumferential edge of the corresponding through-hole 45 on the under side of the fixed plate 42. The protrusions 58b are inserted into the positioning holes 46, the insulating spacers 58 and 59 with the plate spring 52 fixed thereto are inserted into the through-holes 45 of the fixed plate 42 from upper and lower sides, and the rivet 60 is inserted into the mounting hole 53a and through-holes 58c and 59b, whereby the plate spring 52 is fixedly mounted on the fixed plate 42.

Each of the mounting bolts 48 includes the head 49 and the shaft 50. Those bolts have at least two functions: one is to mount the air bag module 8 on the connector arm 2 of the vehicle steering wheel body 1, and the other is to put a distance from the fixed plate 42 to the movable plate 31 at a fixed distance. The shaft 50 includes a large diameter part 50a and a small diameter part 50b extending upwardly of the large diameter part 50a. The small diameter part 50b has a male screw part 50c formed on the middle thereof. The head 49 of each of the mounting bolts 48 engages the circumferential edge of the corresponding engaging hole 33 of the movable plate 31 while the buffering member 51 and the sleeve 63 of the insulating spacer 62 intervening therebetween. The male screw part 50c of each of the shafts 50 is screwed into the mounting hole 3a of the corresponding mounting seat 3 on the connector arm 2. The screwing of the male screw parts 50c of the bolt shafts into the mounting holes 3a brings the under side of the large diameter parts 50a of the bolt shafts into contact with the circumferential edges of the mounting holes 44 of the fixed plate 42. The result is that the fixed plate 42 is brought into contact with the mounting seats 3 of the connector arm 2. The length of the large diameter part 50a of each shaft 50 specifies a distance of the movable contact 56 when it moves to and comes in contact with the fixed contacts 43, viz., a horn stroke H.

Each of the mounting seats 3 of the connector arm 2 is provided with supports 3b for supporting the under side of the fixed plate 42 around each fixed contact 43 (FIGS. 5 and 10).

The buffering members 51, each shaped like a ring-like member made of rubber, functions to prevent interference sounds generated between the head 49 of the mounting bolts 48 and the insulating spacer 62.

The insulating spacer 62, made of insulating material, e.g., polyacetal, is provided for electrically insulating the mounting bolts 48, which are screwed into the connector arm 2 electrically continuous to the negative terminal of the horn drive circuit, from the movable plate 31, as shown in FIGS. 5 to 7, and 9. The length of the insulating spacer 62 corresponds in length to the base member 32 of the movable plate 31. Sleeves 63 are formed in both end portions of the s insulating spacer 62. The sleeves 63 have mounting holes 63a allowing the shafts 50 of the mounting bolts 48 to pass therethrough. Engaging leg portions 64 are provided on the insulating spacer at locations closer to the center of the spacer than the sleeves 63. Each of the engaging leg portions 64 is formed with four legs 64a engaging with the circumferential edge of the corresponding engaging hole 34 while being deformed elastically. The insulating spacer 62 is fastened onto the movable plate 31 by utilization of those engaging leg portions 64.

An engaging protruded part 66 and a positioning protruded part 67 are provided at each of the ends of the insulating spacer 62. When the air bag module 8 is attached to the vehicle steering wheel body 1, the engaging protruded parts 66 are used to temporarily fasten the air bag module 8 onto the horn switch mechanisms 30 before those are fastened by the mounting bolts 48. In this case, the engaging protruded parts 66 are inserted into the through-holes 18e of the assembling plate 17 from the lower side, and elastically deformed to be put on the stepped parts 18d (indicated by solid lines in FIG. 5 and two-dot chain lines in FIGS. 13 and 14). Each engaging protruded part 66 comprises a leg 66a, which upward extends from the main portion 62a of the insulating spacer 62 and is elastically deformable in the longitudinal direction of the insulating spacer 62, and a hook part 66b which is extended toward the end of the insulating spacer 62 at the upper part of the leg 66a, and is put on the stepped part 18d.

When the air bag module 8 is temporarily fastened onto the horn switch mechanisms 30, the positioning protruded parts 67 are inserted into the insertion holes 18e of the assembling plate 17, to thereby position the air bag module 8 immovably. To avoid such a situation that the legs 66a of the engaging protruded parts 66 are brought into contact with the inner surfaces of the through-holes 18e to be excessively deformed, each positioning protruded part 67, shaped like L in cross section, has an inner wall part 67a covering the inner side of the leg 66a and a side wall part 67b covering the side face of the leg 66a in consideration with the dimension on the layout of the two through-holes 18e and the dimension and shape of the through-holes 18e. When the air bag module 8 is horizontally shifted relative to the insulating spacer 62 after it is temporarily fastened, the inner wall part 67a or the side wall part 67b of each positioning protruded part 67 comes in contact with the inner surface of the through-hole 18e, to thereby prevent the leg 66a from being in contact with the inner surface of the through-hole 18e.

The height of the positioning protruded parts 67 measured from the main portion 62a of the insulating spacer is so selected so that when the air bag module 8 is fastened to the horn switch mechanisms 30 already attached to the vehicle steering wheel body 1, by means of the connection bolts 39, the upper end faces 67c of the positioning protruded parts 67 come in contact with the lower faces of the lands 14c in the bag holder of the air bag module 8.

When the air bag module 8 is temporarily fastened to the horn switch mechanisms 30, the horn switch mechanisms 30 are firmly attached in advance to the connector arm 2 of the vehicle steering wheel body 1 by utilization of the mounting bolts 48.

The insulating spacer 62 is provided with an engaging hook 69 and supports 68. The engaging hook 69 fixes the lead wire 41. The supports 68 are placed in the recesses 32b of the movable plate 31 in order to prevent the interference of the lead wire 41 with the movable plate 31.

Assembly of the horn switch mechanisms 30 in the present embodiment will be described briefly. The protrusions 58b are inserted into the positioning holes 46, respectively. The insulating spacer 58 with the plate spring 52 and the insulating spacer 59 are inserted into the through-holes 45 of the fixed plate 42 from upper and lower sides. The rivet 60 is inserted into the mounting hole 53a, and the through-holes 58c and 59b. In this way, the plate spring 52 and the fixed plate 42 are coupled together. The engaging leg portions 64 are inserted into the engaging holes 34, whereby the insulating spacer 62 is assembled to the movable plate 31.

The movable plate 31 is disposed above the plate spring 52, and the buffering members 51 are put on the upper sides of the sleeves 63 of the insulating spacer 62. The mounting bolts 48 are inserted through the mounting holes 63a of the insulating spacer 62 and the through-holes 54a of the plate spring 52. The male screw parts 50c of the mounting bolts 48 are screwed into the mounting holes 44 of the fixed plate 42, and their tips slightly protrude from the mounting holes 44. In this way, the horn switch mechanisms 30 are constructed as assemblies.

The lead wire 41 is connected to one of the horn switch mechanisms 30, and the male screw parts 50c of the mounting bolts 48 are screwed into the mounting holes 3a of the connector arm 2 of the vehicle steering wheel body 1. The result is to mount the two horn switch mechanisms 30 on the vehicle steering wheel body 1 as shown in FIGS. 4 and 5.

After the horn switch mechanisms 30 are mounted on the vehicle steering wheel body 1, the air bag module 8 assembled in advance is applied to the horn switch mechanisms 30 from above, the positioning protruded parts 67 are inserted into the through-holes 18e, and the hook parts 66b of the engaging protruded parts 66 are hooked on the stepped parts 18d, whereby the air bag module 8 is temporarily fastened to the horn switch mechanisms 30. Then, the connection bolts 39, which have been attached to the horn switch mechanisms 30 by utilization of the attachment 38, are screwed into the threaded holes 16b of the bag holder 13. As a result, the air bag module 8 is firmly attached to the horn switch mechanisms 30, while at the same time it is mounted on the vehicle steering wheel body 1.

The work of coupling of the air bag module 8 with the horn switch mechanisms 30 is carried out after the vehicle steering wheel body 1 is mounted on the vehicle body. The lead wire 41 of the horn switch mechanism 30 is connected to a given horn drive circuit when the vehicle steering wheel body 1 is mounted on the vehicle body.

In the present embodiment, the engaging protruded parts 66 of the insulating spacer 62 for temporarily fastening the air bag module 8 to the horn switch mechanisms 30 are placed at positions closer to the ends of the insulating spacer than the sleeves 63, or the mounting bolts 48. In the prior technique, the temporarily fastening holes are located at positions on the base member of the movable plate which are within the positions of the mounting bolts in order to avoid the interference of those fastening holes with the mounting bolts. Accordingly, the fastening holes are close to the coupling plate located at and near to the central portion of the base member of the movable plate. When compared to such prior technique, the present invention enables the engaging protruded parts 66 for temporarily fastening the air bag module 8 to be located further apart from the mounting plate 37 at the central part of the base member 32.

Therefore, the engaging protruded parts 66 are brought into engagement with the stepped parts 18d of the air bag module 8, and the distances from the centers (the positions of the connection bolts 39) of the torques of the air bag module 8 to the engaging protruded parts 66 are long. Therefore, small engaging forces of the engaging protruded parts 66 can stand against large torques. The result is to secure an increased fastening strength of the air bag module 8.

In the above structure, the engaging forces of the engaging protruded parts 66 may be reduced in a state that the fastening strength of the air bag module 8 is increased. This makes it easy to temporarily fasten the air bag module 8 to the horn switch mechanisms 30.

After the vehicle steering wheel W is mounted on the vehicle, one presses the cover 9 to push down air bag module 8. At this time, the movable plate 31 descends while resisting the urging force of the plate spring 52 of the horn switch mechanisms 30, and the movable contacts 56 is made to contact with the fixed contacts 43. As a result, the horn sounds.

When the air bag module 8 is operated, gas flows into the air bag 10 from the inflator 12, and the air bag 10 inflates and breaks the major portion 9a of the cover 9.

In the horn switch mechanisms 30, the engaging leg portions 64, which are elastically deformed to be coupled to the movable plate 31, protrude from the insulating spacer 62. That is, the insulating spacer 62 may be stably attached to the movable plate 31 by utilization of the engaging leg portions 64. In this respect, this structure makes it easy to attach the insulating spacer 62 to the movable plate 31. The structure of the engaging leg portions 64 is not limited to that discussed in this specification. In an alternative, the legs 64a are provided on the outer edges of the insulating spacer 62, and when the insulating spacer 62 is attached to the movable plate 31, the engaging leg portions 64 of the fixed plate 42 are brought into engagement with the outer edges of the base member 32 of the movable plate 31.

In the present embodiment, the positioning protruded parts 67 for preventing the legs 66a from being unnecessarily deformed are respectively provided adjacent to the engaging protruded parts 66, to thereby position the air bag module 8 immovably when the air bag module 8 is temporarily fastened. When the air bag module 8 is attached to the vehicle steering wheel body 1 already mounted on the vehicle body, the axial direction of the vehicle steering wheel body 1 is slanted while being parallel to the steering shaft (not shown), and the mounting plate 37 of the horn switch mechanisms 30 is also slanted. Therefore, when the heavy air bag module 8 is disposed while being brought into contact with the mounting plate 37, the air bag module 8 will drop or be displaced easily by its weight. At this time, the weight of the air bag module 8 does not act on the legs 66a of the engaging protruded parts 66 because of the presence of the positioning protruded parts 67. Therefore, the engaging protruded parts 66 are not unnecessarily deformed.

After attaching the air bag module 8, the upper end faces 67c of the positioning protruded parts 67 are brought into contact with the under surfaces of the lands 14c located at the four corners of the bag holder 13 of the air bag module 8. To be more specific, the positioning protruded parts 67 are located at the ends of the insulating spacer 62 and close to the movable contacts 56. When the horn is depressed and the air bag module 8 is pushed down, the positioning protruded parts 67 located close to the movable contacts 56 are pressed from the corners of the outer peripheral edge of the bag holder 13. The result is that the movable contacts 56 are directly pressed against the fixed contacts 43. This unique structure stabilizes the horn depressing operation.

In the present embodiment, the side wall parts 67b of the positioning protruded parts 67 are located on the side of the engaging protruded parts 66, which is closer to the center of the air bag module 8. Alternatively, those side wall parts 67b may be located on the side opposite to the above one, which is closer to the outside of the air bag module 8.

In the above-mentioned embodiment, the hook parts 66b of the engaging protruded parts 66 are extended toward the ends of the insulating spacer 62. If required, the hook parts 66b may be extended toward the center of the insulating spacer 62 if the stepped parts 18d being brought into engagement with the air bag module 8 are correspondingly located. In this case, the inner wall parts 67a of the positioning protruded parts 67 are located closer to the ends of the insulating spacer 62, viz., the inner wall parts 67a serve as the outer wall parts. The side wall part 67b may be located on either side of the leg 66a.

The shape of the engaging protruded parts 66 is not limited to that in the embodiment if it can be brought into engagement with the air bag module 8. In an alternative, engaging holes are formed in the air bag module 8, the head parts of the engaging protruded parts 66 are reduced in diameter and inserted into those engaging holes as in the publication referred to above.

Further, in the horn switch mechanisms 30 according to the present invention, the plate spring 52 includes the mounting portion 53 mounted on the central portion of the fixed plate 42, and the two spring pieces 54 which are extended from the mounting portion 53 in the opposite directions and brought into contact with the under sides of both ends of the movable plate 31. Further, it includes the through-holes 54*a* through which the mounting bolts 48 are inserted so as to prevent the spring pieces 54 from interfering with the mounting bolts 48. Thus, with provision of the through-holes 54*a*, there is no fear that the plate spring 52 interferes with the mounting bolts 48. Therefore, the spring pieces 54 are extended up to the positions near to both ends of the movable plate 31 without any obstacle, and support the movable plate 31 at those positions. Further, there is no need of shifting the positions of the mounting bolts 48 from the positions near to both ends of the movable plate 31.

For this reason, the mounting bolts 48 and the contact parts 54*b* brought into contact with the movable plate 31 of the plate spring 52 may be placed near the movable contacts 56 located at both ends of the movable plate 31. Therefore, the horn may be depressed without any rolling of the air bag module.

Provision of the through-holes 54*a* of the plate spring 52 for preventing it from interfering with the mounting bolts 48 does not lead to a rolling of the air bag module. In the embodiment, the plate spring 52 is symmetrical with respect to the center line thereof extending in its longitudinal direction. Therefore, the plate spring 52 per se is not twisted when the horn is operated, and hence, the air bag module is not rolled.

Further, in the embodiment, there is no need of reducing the diameter of the mounting bolts 48. Therefore, a mounting strength of the air bag module 8 to the vehicle steering wheel body 1 is not impaired. When the air bag module 8 is operated, gas flows into the air bag 10 from the inflator 12, and the air bag 10 inflates and breaks the major portion 9*a* of the cover 9. At the end of the inflating motion of the air bag 10, an inertia of the expansion of the air bag 10 acts, so that the bag holder 13 is forcibly pulled up. A strong upward tension acts on the mounting bolts 48 through the movable plate 31. For this reason, the mounting bolts 48 must have a predetermined strength high enough to withstand the upward tension.

As described above, an urging means for urging upward the movable plate 31 comprises one plate spring 52 in order to reduce the number of required components parts. However, the air bag module is not rolled when the horn is operated, and the mounting strength of the air bag module 8 onto the vehicle steering wheel body 1 is not impaired.

Further, in the present embodiment, the plate spring 52 is used for urging means for urging upward the air bag module 8 together with the movable plate 31. It is easy to obtain a large urging force by adjusting the thickness of the plate springs. Further, the height of the horn switch mechanisms 30 may be reduced to approximately half of the conventional one which uses coiled springs. Therefore, the space within the vehicle steering wheel W may be efficiently utilized. In a case where the connector arm 2 is deformed by the self-aligning mechanism, the horn switch mechanisms 30 interfere less with other members. In this respect, the horn switch mechanisms 30 of the invention are easily adaptable to the vehicle steering wheel W provided with the self-aligning mechanism.

Also in the horn switch assembly comprising the horn switch mechanisms 30, which is the embodiment of the invention, the supports 3*b* of the mounting seats 3 on the connector arm 2 of the vehicle steering wheel body 1 are brought into contact with the under sides of the fixed plate 42 around the fixed contacts 43. The strength to the deformation is improved in the portions of the fixed plate 42 located near the fixed contacts 43 of the fixed plate 42 when the horn is operated.

Next, detailed descriptions of the lower cover 6, the spoke portions S and the metal connector arm 2 will be provided.

The spoke portions S are classified into two fore spokes Sf disposed on the fore side and two back spokes Sb disposed on the back side.

Figure 15:
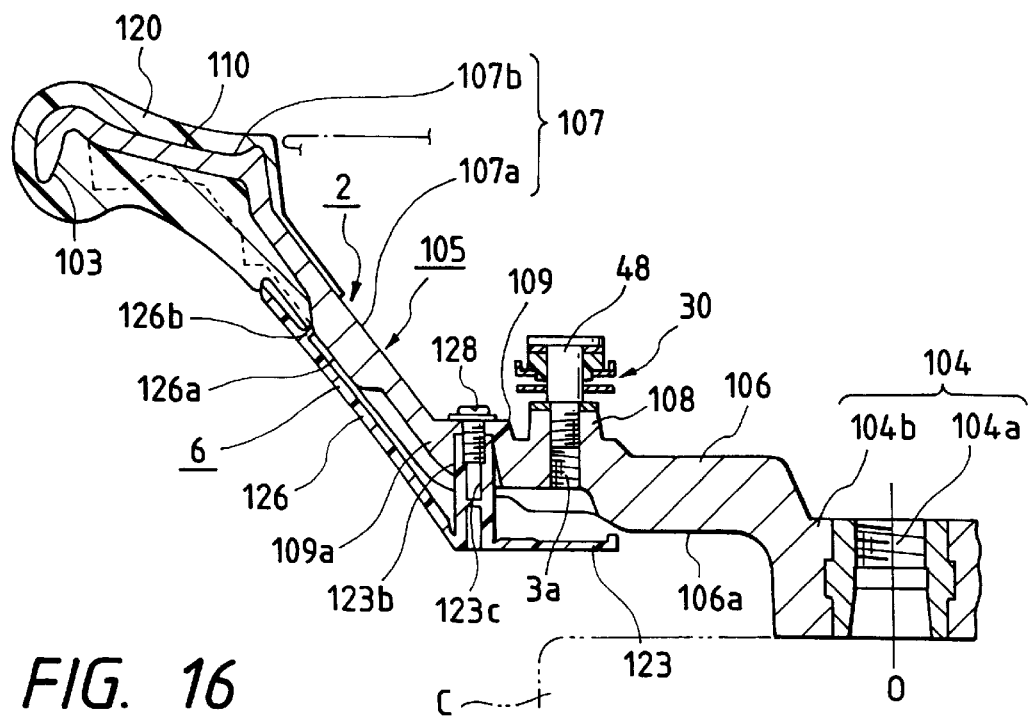
FIG. 15 is a cross sectional view taken along line IV—IV in FIG. 4.
Figure 16:
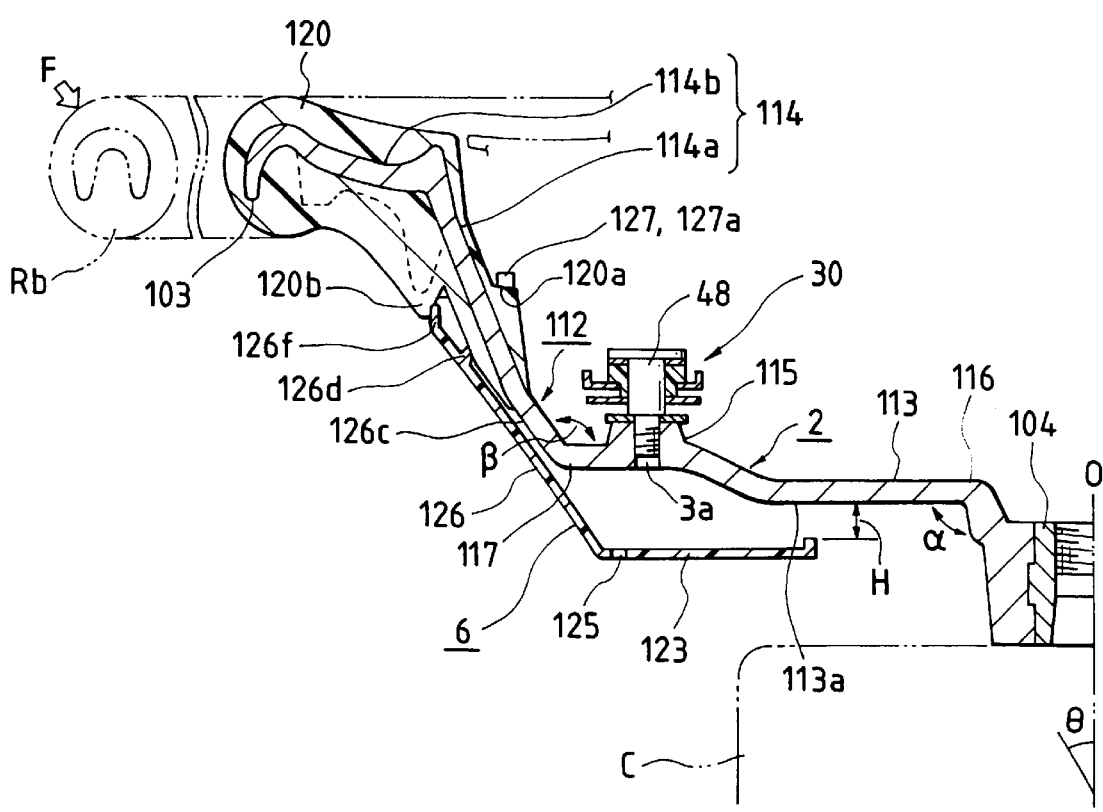
FIG. 16 is a cross sectional view taken along line VI—VI in FIG. 4.

As shown in FIGS. 10, 15, 16, the metal connector arm 2 includes a ring arm section 103 extending in the ring portion R, a boss arm section 104 extending in the boss portion B, fore-spoke arm sections 105 extending in the fore spokes Sf, and back-spoke arm sections 112 extending in the back spokes Sb. The boss arm section 104 includes a boss 104*a* that is made of steel and connected to a steering wheel shaft (not shown). A covering 104*b* covering the boss 104*a*, fore-spoke arm sections 105, back-spoke arm sections 112, and ring arm section 103 are die cast using aluminum alloy.

As shown in FIGS. 4, 10, 15 and 16, the fore- and back-spoke arm sections 105 and 112 include inner portions 106 and 113 extending from the boss arm section 104 in the direction substantially perpendicular to the axis O of the boss arm section 104, and outer portions 107 and 114 extending obliquely, upwardly and outwardly from the inner portions 106 and 113 up to the ring arm section 103.

As shown in FIG. 16, the inner portion 113 of each of the back-spoke arm sections 112 is radially extended beyond a column cover C covering a steering shaft (not shown). The inner portions 113 of the back-spoke arm sections 112 are extended from the covering 104*b* of the boss arm section 104 at a position which is higher than a position where the inner portions 106 of the fore-spoke arm sections 105 exit. The under sides 113*a* of the inner portions 113 are disposed at a position higher than a position where the under sides 106*a* of the inner portions 106 of the fore-spoke arm sections 105 exist, whereby a large gap H is present between each inner portion 113 and a bottom wall portion 123 (to be described later) of the lower cover 6.

The outer portions 107 and 114 include slanted parts 107*a* and 114*a* extended outwardly from the inner portions 106 and 113, and horizontal parts 107*b* and 114*b* extended from the tops of the slanted parts 107*a* and 114*a* substantially horizontally, or in the direction substantially perpendicular to the axis O of the boss arm section 104.

Mounting seats 108 and 115 are provided at locations of the inner portions 106 and 113 closer to the outer portions 107 and 114. Those mounting seats 108 and 115 are threaded to have female screws therein. The air bag module 8 is mounted on the mounting seats 108 and 115 in a state that a horn switch assembly comprising horn switch mechanisms 30 intervenes therebetween.

Torsional deformation parts 110, torsionally deformable, are provided at locations on the fore-spoke arm sections 105 closer to the ring arm section 103 than the mounting seats 108, respectively. In this embodiment, the torsional deformation parts 110 are provided on the horizontal parts 107*b* of the outer portions 107, respectively. The torsional deformation parts 110 may be provided on the inner portions 106 or the slanted parts 107a in consideration with the ribs on both side edges thereof and the shape of their cross section. In this connection, it is only needed that the torsional deformation parts 110 are located closer to the ring arm section 103 than the mounting positions of the air bag module 8.

Mounting seats 109 with mounting holes 109a are provided at locations on the inner portions 106 of the fore-spoke arm sections 105 where are close to the outer portions 107. The fore part of the lower cover 6 is fixed to those mounting seats 109 by means of screws 128.

First bending deformation parts 116, bending deformable, are provided at locations on the inner portions 113 of the back-spoke arm sections 112 where are close to the boss arm section 104. Second bending deformation parts 117, bending deformable, are provided at locations on the inner portions 113 where are close to the ring arm section 103.

The first bending deformation parts 116 are each provided at a location closer to the boss arm section 104 than the mounting seat 115 as one of the mounting positions of the air bag module 8. In this embodiment, it is formed at a bending part of the inner portion where the inner portion, which is extended upwardly from the covering 104b of the boss arm section 104 around the boss 104a, is bent in the direction perpendicular to the axis O of the boss arm section 104.

Each second bending deformation part 117 is provided at a location closer to the ring arm section 103 than the column cover C and the mounting seat 115 as one of the mounting positions of the air bag module 8. In this embodiment, it is located at the boundary between the inner portions 113 and the outer portions 114.

Ribs (not shown) are provided on and along both side edges of the back-spoke arm sections 112 except the first and second bending deformation parts 116 and 117. Therefore, those bending deformation parts are easily bendable. The first bending deformation part 116 has a lower bending rigidity than the second bending deformation part 117. Therefore, the width of the first bending deformation part 116 is narrower than of the second bending deformation part 117, and greatly bent so as to enable stress to be readily concentrated thereat.

The ring arm section 103 of the metal connector arm 2, and the portions of the fore- and back-spoke arm sections 105 and 112, which are close to the -ring arm section 103, are covered with a covering 120 made of synthetic resin.

The lower cover 6 is made of synthetic resin, e.g., polypropylene. As shown in FIGS. 5, 15 to 18, the lower cover 6 includes the bottom wall portion 123 and a circumferential side wall 126. The bottom wall portion 123 is located under the inner portions 106 and 113 of the fore- and back-spoke arm sections 105 and 112. The side wall 126 extends obliquely and upwardly from the circumferential edge of the bottom wall portion 123 up to the middle of the outer portions 107 and 114 of the fore- and back-spoke arm sections 105 and 112.

An insertion hole 123a through which the steering shaft, not shown, is inserted is formed in the central portion of the bottom wall portion 123. A couple of mounting bosses 123b with mounting holes 123c are formed in the front part of the bottom wall portion 123. The mounting bosses 123b serve as mounting portions where the front part of the lower cover 6 is attached to the fore-spoke arm sections 105 by means of the screws 128. The mounting bosses 123b are moved to approach to the mounting seats 109, and attached to the latter by means of the screws 128 inserted through the mounting holes 109a.

Recesses 126b and 126c are formed in the upper parts of the side wall 126. The fore- and back-spoke arm sections 105 and 112 are put on those recesses 126a and 126c. Supporting ribs 126b and 126d, respectively, are formed on the recesses 126a and 126c, and support the lower sides of the fore- and back-spoke arm sections 105 and 112. Through-holes 126e are formed at locations of the right and left sides of the side wall 126, respectively. Those through-holes 126e are used for tightening the connection bolts 39 to attach the air bag module 8 to the horn switch mechanisms 30.

Engaging legs 127 protrude from each recess 126c of the rear part of the upper end of the side wall 126. Both sides of the outer portion 114 of each back-spoke arm section 112 are inserted into between the engaging legs 127 from the lower side, while elastically deforming those engaging legs 127, and placed therebetween. The engaging legs 127 have hook pieces 127a at their tips. The hook pieces 127a of the engaging legs 127 are hooked on a flat part 120a of the covering 120, which covers the outer portions 114 of the back-spoke arm sections 112.

Figure 17:
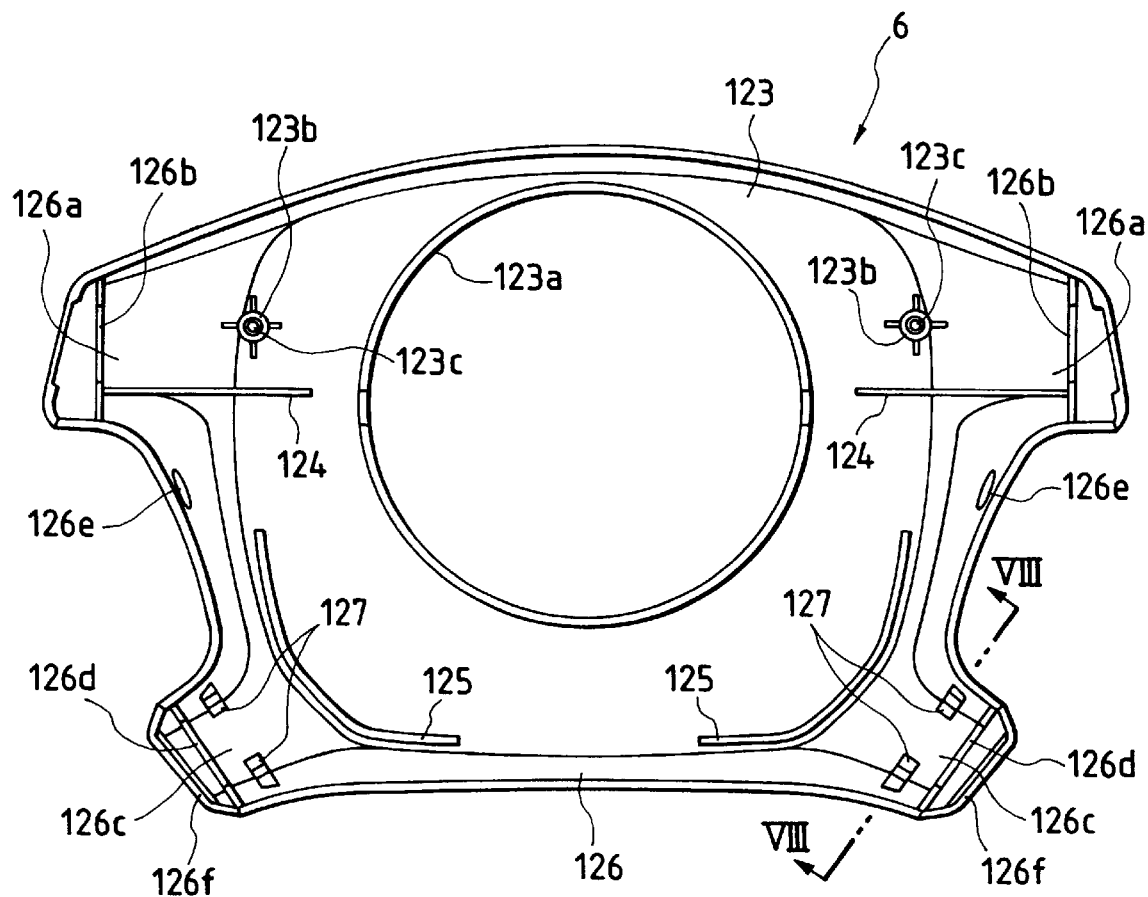
FIG. 17 is a plan view showing a lower cover.
Figure 18:
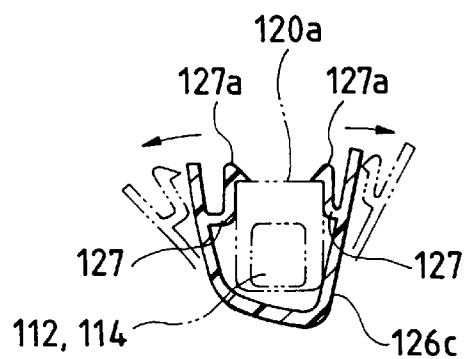
FIG. 18 is a cross sectional view showing the lower cover, taken along line VIII—VIII in FIG. 17.

The bottom wall portion 123 of the lower cover 6 includes deformation auxiliary means which facilitates the deformation of its near portion with the reduced thickness, viz., slits 125 as through holes located near the back-spoke arm sections 112. In FIG. 17, reference numeral 124 designates reinforcing ribs 124 ranging from the side wall 126 to the bottom wall portion 123.

The vehicle steering wheel W is mounted on the vehicle such that an angle θ of the axis O of the boss arm section 104 to the horizontal direction (FIG. 16) is about 30°.

Figure 19:
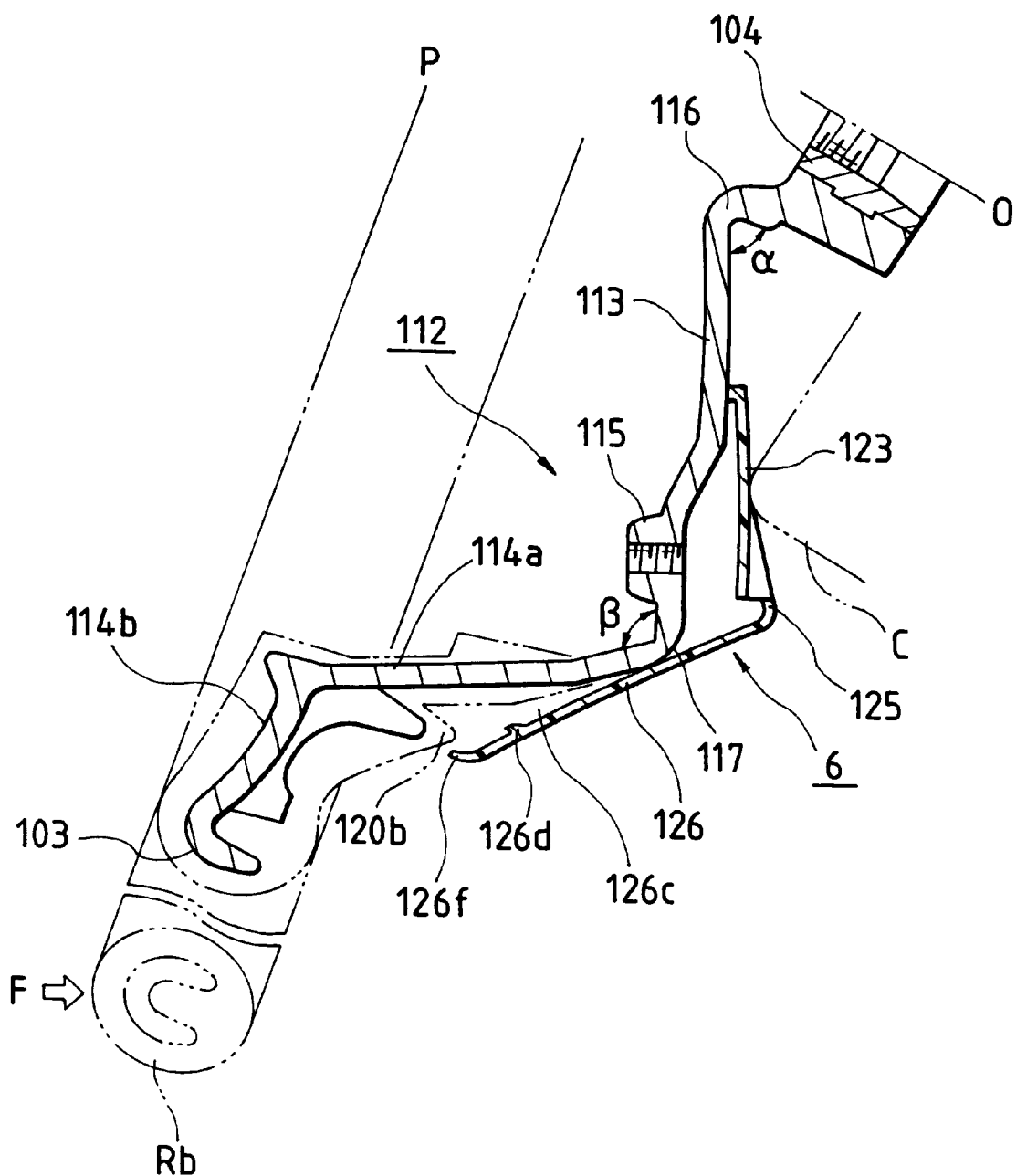
FIG. 19 is a cross sectional view useful in explaining a deformation of the metal connector arm.

It is supposed that an impact force F acts on the back side Rb (FIGS. 4 and 16) of the ring portion of the vehicle steering wheel W mounted on the vehicle, in the forward direction. In this case, the torsional deformation parts 110 of the fore-spoke arm sections 105 are first torsionally deformed, and with the progresses of the torsional deformation, the first bending deformation parts 116 of the back-spoke arm sections 112 are plastically deformed and bent so as to reduce an angle a (FIG. 19). And the surface P of the ring portion vertically moves. In this case, a part at and near to each torsional deformation part 110 serves as the movement center.

The function of the deformation follows. The first bending deformation parts 116 are each located closer to the boss arm section 104 than the mounting seat 115 of the air bag module 8. Therefore, when the ring portion surface P moves with progression of the deformation of the torsional deformation parts 110, the mounting seats 115 of the air bag module 8 in the back-spoke arm sections 112 also move. Accordingly, the upper surface of the cover 9 of the air bag module 50 may be moved following the ring portion surface P. The result is to prevent the air bag module 50 from unnecessarily protruding from the ring portion surface P.

Figure 20:
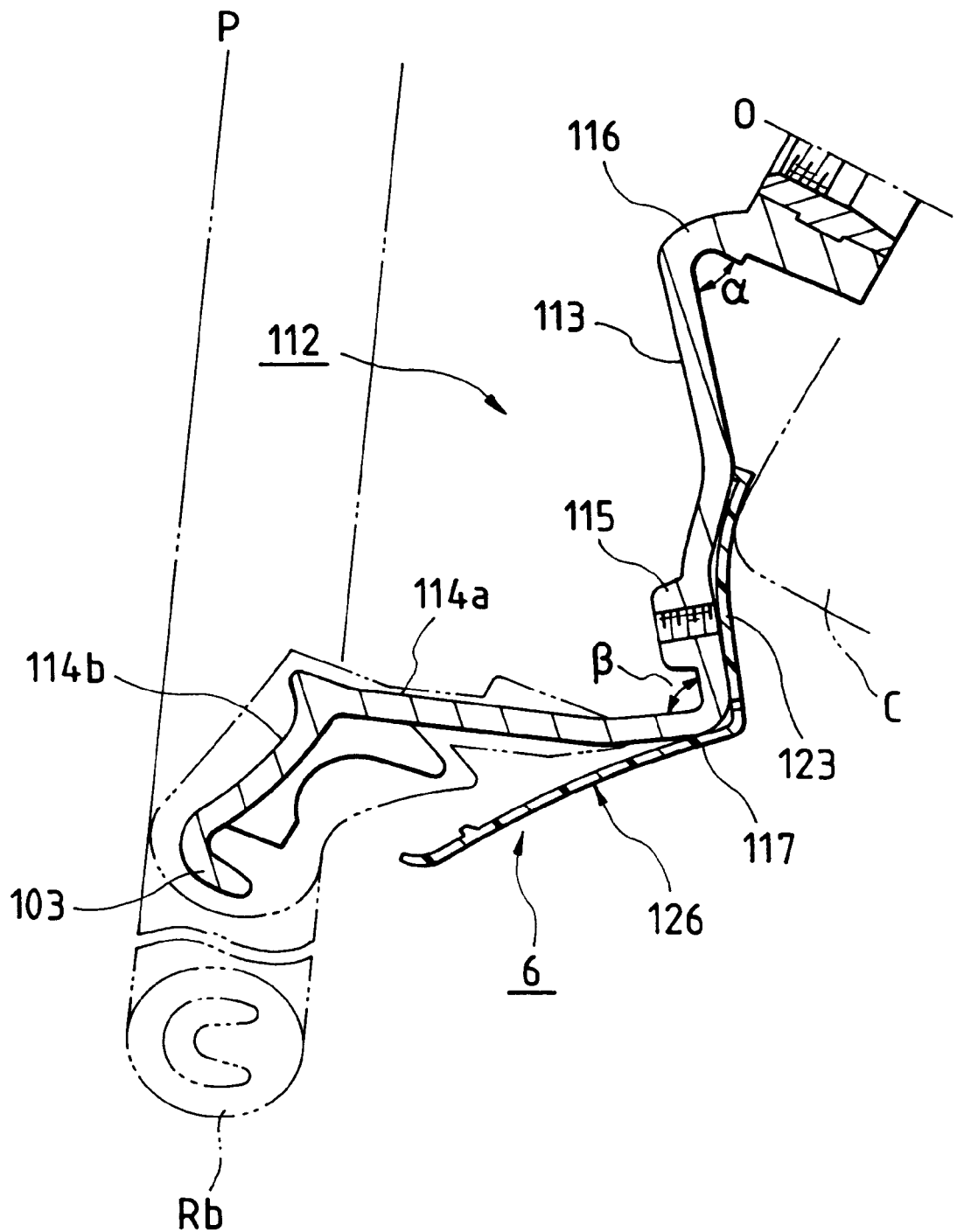
FIG. 20 is a cross sectional view useful in explaining a deformation of the metal connector arm after the connector arm undergoes the deformation shown in FIG. 19.
Figure 21:
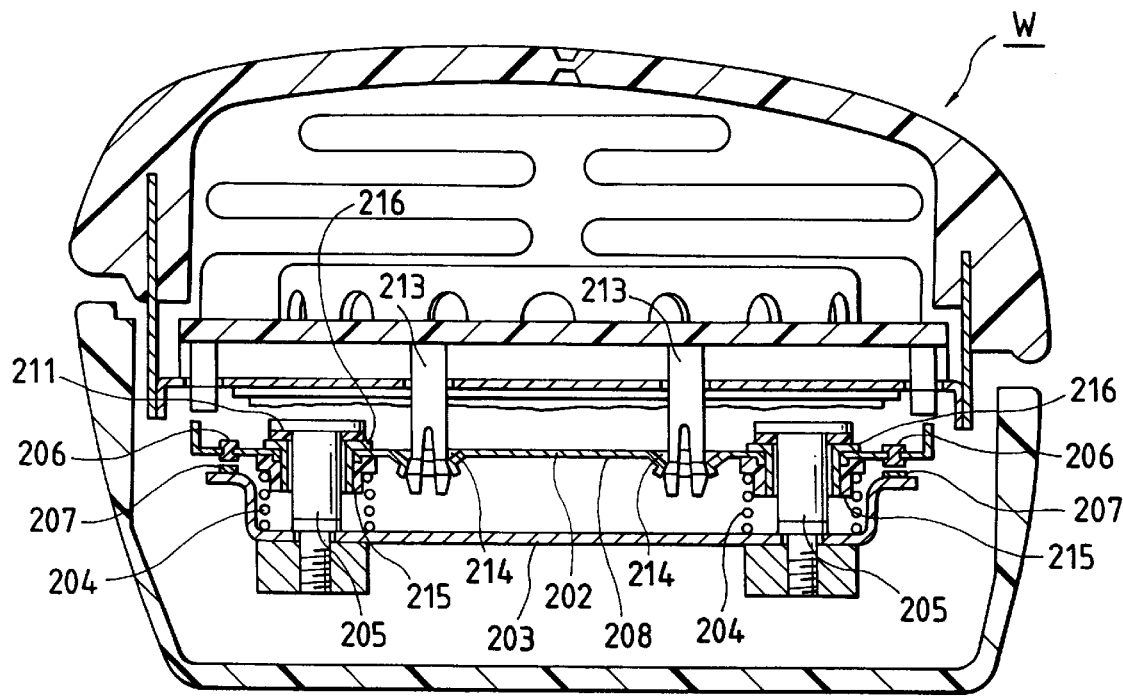
FIG. 21 is a cross sectional view showing a conventional vehicle steering wheel with a horn switch mechanism in FIG. 23.
Figure 22:
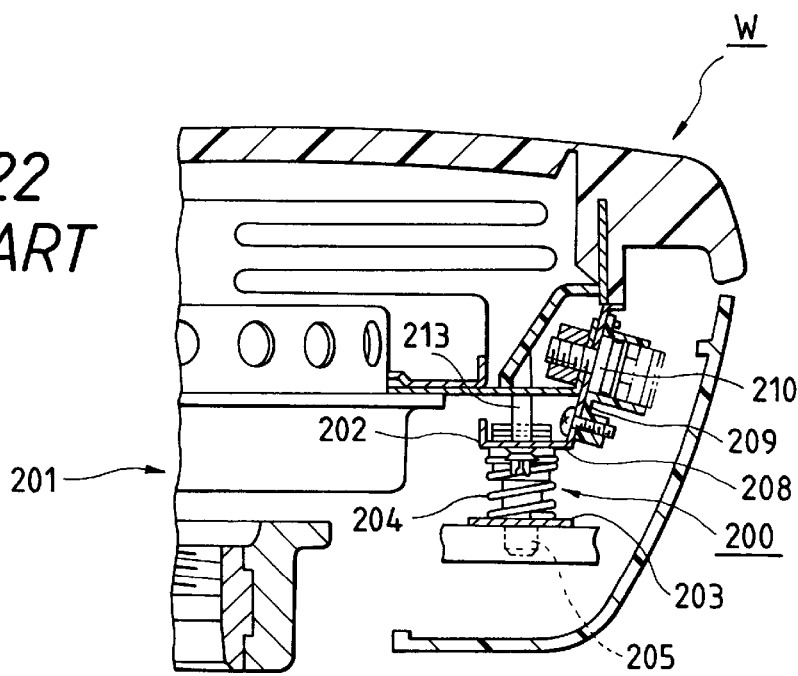
FIG. 22 is a cross sectional view showing a conventional vehicle steering wheel in FIG. 23.
Figure 23:
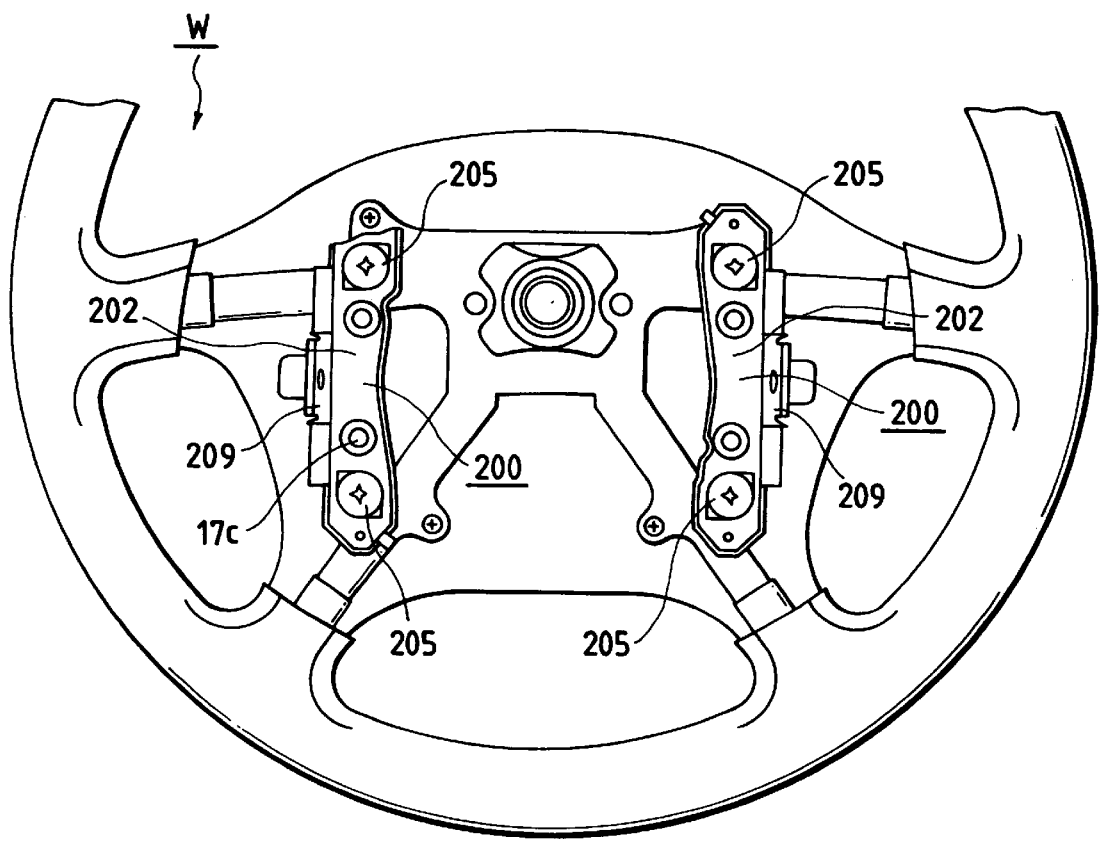
FIG. 23 is a plan view showing conventional vehicle steering wheel with a horn switch mechanism.
Figure 24:
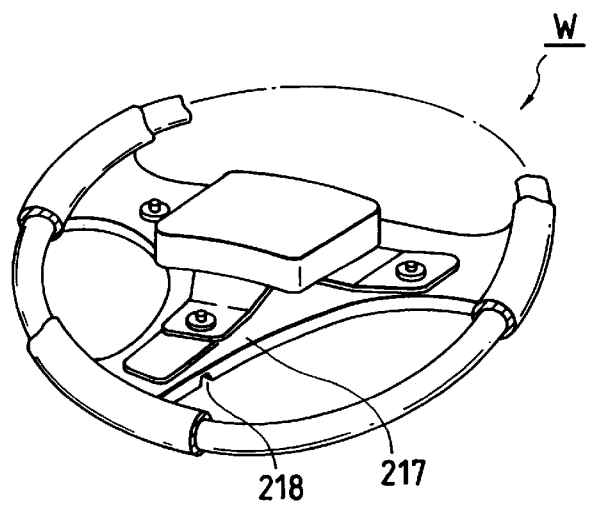
FIG. 24 is a perspective view showing another conventional vehicle steering wheel.

Thereafter, even if the back spokes Sb (back-spoke arm sections 112) interfere with the column cover C, the second bending deformation parts 117 of the back-spoke arm sections 112 are located closer to the ring arm section 103 than the column cover C as shown in FIG. 20, and the second bending deformation parts 117 is plastically deformed and bent to reduce an angle β, and the ring portion surface P further moves in the vertical direction, with a part at and near to the torsional deformation parts 110 as the movement center.

Additionally, the first and second bending deformation parts 116 and 117 of the back-spoke arm sections 112 are deformed. In this case, those may be deformed with a little resistance. Accordingly, it does not hinder the deformation of the back-spoke arm sections 112. The reason for this follows. When the bending deformation parts are deformed, the back side of the bottom wall portion 123 of the lower cover 6 first comes in contact with the column cover C. In the back side of the lower cover 6, the upper end portion of the side wall 126 is fastened to the outer portions 114 of the back-spoke arm sections 112. A distance from the portion of the bottom wall portion 123 where it is in contact with the column cover C to its mounting position to the back-spoke arm sections 12 is long. So the deformation of the back-spoke arm sections 112 is not hindered.

Thereafter, the deformation of the first and second bending deformation parts 116 and 117 of the back-spoke arm sections 112 progresses in a state that the bottom wall portion 123 is in contact with the column cover C. With the deformation, the inner portions 113 and the outer portions 114 of the back-spoke arm sections 112 move toward the bottom wall portion 123 of the lower cover 6. At this time, the under sides 113a of the inner portions 113 of the back-spoke arm sections 112 rise, and the large gap H is present between each inner portion 113 and the bottom wall portion 123, so that the abutting of the back-spoke arm sections 112 against the lower cover 6 retards. As a result, a hindrance of the deformation of the back-spoke arm sections 112 by the lower cover 6 is minimized.

In the vehicle steering wheel W in the embodiment, when an impact force F acts on the back side Rb of the ring portion in the forward direction, the torsional deformation parts 110 of the fore-spoke arm sections 105 are progressively deformed, and the back-spoke arm sections 112 plastically deforms the first and second bending deformation parts 116 and 117. Thus, the deformation progresses in two successive steps. At this time, the second bending deformation parts 117 may be deformed without any interference with the column cover C. Therefore, a deformation stroke of the back-spoke arm sections 112 may be set to be large. A hindrance of the deformation of the back-spoke arm sections 112 by the lower cover 6 is minimized. Therefore, an affect by the lower cover 6 can be suppressed. The energy of the impact force F can be absorbed sufficiently.

In the embodiment, the lower cover 6 is attached to the back-spoke arm sections 112 by utilization of the engaging legs 127 that are elastically deformed to be brought into engagement with the back-spoke arm sections 112 from the lower side. Therefore, when the bottom wall portion 123 interferes with the column cover C, the back side of the side wall 126 is pushed in the direction opposite to the direction of the engaging of the engaging legs 127, viz., in the upward direction. In other words, the inner edges 126f at the tops of the recesses 126c are brought into contact with the end face 120b of the covering 120 (FIG. 16), and the recesses 126c on the back side are expanded as indicated by two-dot chain lines in FIG. 18, without any increase of a deformation load of the lower cover 6. The side wall 126 of the lower cover 6 may be removed from the back-spoke arm sections 112. For this reason, the hindrance of the deformation of the back-spoke arm sections 112 by the lower cover 6 is further reduced.

In the embodiment, the slits 125, as the deformation auxiliary means which facilitates the deformation of its near portion with the reduced thickness, are formed near the back-spoke arm sections 112 of the lower cover 6. When the bottom wall portion 123 interferes with the column cover C and the back-spoke arm sections 112, the periphery of the mounting portions to the back-spoke arm sections 112, i.e., the circumferential edges of the recesses 126c, are easily deformed with the aid of the slits 125. Therefore, the hindrance of the deformation of the back-spoke arm sections 112 by the lower cover 6 is further reduced.

In the above-mentioned embodiment, the number of the back spokes Sb is two. It is evident that the present invention is applicable to a vehicle steering wheel with three spokes including one back spoke Sb.

Also in the embodiment, the front side of the lower cover 6 is secured to the fore-spoke arm sections 105 by means of the screws 128. Alternatively, the bottom wall portion 123 and the side wall 126 in the front side of the lower cover 6 may be secured to the covering 104b by means of the screws 128 if the covering 104b of the boss arm section 104 is extended and proper mounting seats are provided on the extended part.

In the embodiment mentioned above, the slits 125 are used for the deformation auxiliary means. If the periphery of the mounting portions to the back-spoke arm sections 112 are easy to be deformable, the deformation auxiliary means may be formed on the side wall 126 or the bottom wall portion 123 in the form of a reduced thickness, not continuous or discontinuous through holes.

What is claimed is:

1. A vehicle steering wheel provided with an air bag module and disposed above a column cover, comprising:

a ring arm section circular in shape, a boss section disposed at a central portion of said ring arm section and connected to a steering wheel shaft, the air bag module being disposed above said boss section; and spoke sections interconnecting said boss section and said ring arm section, said spoke sections including two fore-spoke arm sections disposed on a fore side of the steering wheel and at least one back-spoke arm section disposed on a back side of the steering wheel, wherein said fore- and back-spoke arm sections respectively include fore- and back-inner portions extending from said boss section in a direction substantially perpendicular to an axis of said boss section, and fore- and back-outer portions extending upwardly and outwardly from said fore- and back-inner portions up to said ring arm section, and the air bag module is fixed to said fore- and back-inner portions of said fore- and back-spoke arm sections, and wherein said fore-spoke arm sections include a torsional deformation part being provided closer to said ring arm section than a mounting portion of the air bag module, and said at least one back-spoke arm section includes a first bending deformation part being provided in said back-inner portion closer to said boss section than the mounting portion of the air bag module, and a second bending deformation part being provided closer to said ring arm section than the column cover and the mounting portion of the air bag module, said first bending deformation part having a lower bending rigidity than said second bending deformation part.

2. The vehicle steering wheel provided with an air bag module according to claim 1, further comprising a lower cover being disposed above the column cover and on a lower side of said boss section and said spoke sections, said lower cover comprising:

a bottom wall being located under said fore- and back-inner portions of said fore- and back-spoke arm sections; and a side wall extending obliquely and upwardly from a circumferential edge of said bottom wall up to a middle of said fore- and back-outer portions of said fore- and back-spoke arm sections, wherein an upper end portion of a back side of said side wall is attached to said back-outer portion of said back-spoke arm section.

3. The vehicle steering wheel provided with an air bag module according to claim 2 wherein an under side of said back-inner portion of said back-spoke arm section is disposed at a position higher than a position where an under side of said fore-inner portion of said fore-spoke arm section exists, whereby a large gap is present between said back-inner portion and said bottom wall.

4. The vehicle steering wheel provided with an air bag module according to claim 2, wherein said lower cover is attached to said back-spoke arm section by an engaging leg which is elastically deformed to be brought into engagement with said back-spoke arm section.

5. The vehicle steering wheel provided with an air bag module according to claim 2 wherein deformation auxiliary means for facilitating a deformation of said lower cover are formed near said back-spoke arm sections of said lower cover.

6. The vehicle steering wheel provided with an air bag module according to claim 5, wherein said deformation auxiliary means is a slit which penetrates said bottom wall.

* * * * *